(12) United States Patent
Shinohara et al.

(10) Patent No.: US 9,746,694 B2
(45) Date of Patent: Aug. 29, 2017

(54) LENS SET, METHOD OF DESIGNING LENS AND METHOD OF MANUFACTURING LENS

(71) Applicant: EHS LENS PHILIPPINES, INC., Cavite (PH)

(72) Inventors: Toshihide Shinohara, Chino (JP); Tadashi Kaga, Kamiina-gun (JP); Ayumu Ito, Kamiina-gun (JP); Takateru Mori, Kamiina-gun (JP)

(73) Assignee: EHS LENS PHILIPPINES, INC., General Trias (PH)

( * ) Notice: Subject to any disclaimer, the term of this patent is extended or adjusted under 35 U.S.C. 154(b) by 0 days.

(21) Appl. No.: 14/383,327

(22) PCT Filed: Feb. 13, 2013

(86) PCT No.: PCT/JP2013/000776
§ 371 (c)(1),
(2) Date: Sep. 5, 2014

(87) PCT Pub. No.: WO2013/132752
PCT Pub. Date: Sep. 12, 2013

(65) Prior Publication Data
US 2015/0077703 A1 Mar. 19, 2015

(30) Foreign Application Priority Data
Mar. 5, 2012 (JP) ................... 2012-047941

(51) Int. Cl.
*G02C 7/06* (2006.01)
*G02C 7/02* (2006.01)

(52) U.S. Cl.
CPC ............ *G02C 7/065* (2013.01); *G02C 7/024* (2013.01); *G02C 7/068* (2013.01)

(58) Field of Classification Search
CPC .............. G02C 7/024; G02C 7/041; G02C 7/061–7/065; G02C 7/028
(Continued)

(56) References Cited

U.S. PATENT DOCUMENTS

| 7,399,080 B2 | 7/2008 | Kitani et al. |
| 2004/0233385 A1 | 11/2004 | Kitani et al. |

(Continued)

FOREIGN PATENT DOCUMENTS

| EP | 1 691 232 A1 | 8/2006 |
| EP | 2 237 100 A1 | 10/2010 |

(Continued)

OTHER PUBLICATIONS

Sep. 17, 2015 Extended Search Report issued in European Patent Application No. 13757829.0.
(Continued)

*Primary Examiner* — Darryl J Collins
*Assistant Examiner* — Journey Sumlar
(74) *Attorney, Agent, or Firm* — Oliff PLC

(57) ABSTRACT

There is provided a progressive addition lens for spectacles including a distance portion and a near portion having different powers, wherein an equivalent spherical power of the distance portion is plus; and a first lens and a second lens having different addition powers from each other, and a difference between vertical surface power in the distance portion and vertical surface power in the near portion on an object-side surface of the first lens, and a difference between vertical surface power in the distance portion and vertical surface power in the near portion on an object-side surface of the second lens are the same.

3 Claims, 30 Drawing Sheets

(58) Field of Classification Search
USPC ............ 351/159.01, 159.06, 159.05, 159.42,
351/159.72, 159.43, 159.74, 159.75,
351/159.4
See application file for complete search history.

(56) References Cited

U.S. PATENT DOCUMENTS

| | | |
|---|---|---|
| 2006/0092375 A1 | 5/2006 | Menezes et al. |
| 2010/0245763 A1 | 9/2010 | Shinohara et al. |
| 2012/0259596 A1 | 10/2012 | Shinohara et al. |

FOREIGN PATENT DOCUMENTS

| | | |
|---|---|---|
| EP | 2 508 937 A1 | 10/2012 |
| JP | A-2003-344813 | 12/2003 |
| JP | A-2004-4436 | 1/2004 |
| JP | A-2010-2713 | 1/2010 |
| JP | A-2012-220655 | 11/2012 |
| WO | WO 97/19382 A1 | 5/1997 |
| WO | WO 97/19383 A1 | 5/1997 |
| WO | WO 2006/045642 A1 | 5/2006 |
| WO | WO 2012/115258 A1 | 8/2012 |

OTHER PUBLICATIONS

International Search Report issued in International Patent Application No. PCT/JP2013/000776 mailed May 21, 2013.
International Preliminary Report on Patentability issued in International Patent Application No. PCT/JP2013/000776 dated Sep. 9, 2014.

| Sph | Add | | | | | | | | | | | | |
|---|---|---|---|---|---|---|---|---|---|---|---|---|---|
| | 0.50 | 0.75 | 1.00 | 1.25 | 1.50 | 1.75 | 2.00 | 2.25 | 2.50 | 2.75 | 3.00 | 3.25 | 3.50 |
| +6.00 | | | G9 | | | | G10 | | | | | G11 | |
| +5.75 | | | | | | | | | | | | | |
| +5.50 | | | | | | | | | | | | | |
| +5.25 | | G8 | | | | | | | | | | | |
| +5.00 | | | | | | | | | | | | | |
| +4.75 | | | | | | | | | | | | | |
| +4.50 | | G7 | | | | | | | | | | | |
| +4.25 | | | | | | | | | | | | | |
| +4.00 | | | | | | | | | | | | | |
| +3.75 | | | | | | | | | | | | | |
| +3.50 | | | | | | | | | | | | | |
| +3.25 | | G6 | | | | | | | | | | | |
| +3.00 | | | | | | | | | | | | | |
| +2.75 | | | | | | | | | | | | | |
| +2.50 | | | | | | | | | | | | | |
| +2.25 | | G5 | | | | | | | | | | | |
| +2.00 | | | | | | | | | | | | | |
| +1.75 | | | | | | | | | | | | | |
| +1.50 | | | | | | | | | | | | | |
| +1.25 | | | | | | | | | | | | | |
| +1.00 | | | | | | | | | | | | | |
| +0.75 | | | | | | | | | | | | | |
| +0.50 | | G4 | | | | | | | | | | | |
| +0.25 | | | | | | | | | | | | | |
| 0.00 | | | | | | | | | | | | | |

FIG. 4

| LENS PRESCRIPTION | | PARAMETER | | | |
|---|---|---|---|---|---|
| Sph | Add | No | BC (VERTICAL) | BC (HORIZONTAL) | TORIC ELEMENT | REVERSED PROGRESSION |
| 4.00 | 2.00 | EX.1-1 | 7.0 | 8.0 | 1.0 | -1.00 |
| | | EX.1-2 | 8.0 | 9.0 | 1.0 | -2.00 |
| | | EX.1-3 | 9.0 | 10.0 | 1.0 | -3.00 |
| | | COM.EX.1 | 7.0 | 7.0 | — | — |
| 4.00 | 1.00 | EX.2-1 | 6.0 | 7.0 | 1.0 | -1.00 |
| | | EX.2-2 | 7.0 | 8.0 | 1.0 | -2.00 |
| | | EX.2-3 | 8.0 | 9.0 | 1.0 | -3.00 |
| | | COM.EX.2 | 6.0 | 6.0 | — | — |
| 4.00 | 3.00 | EX.3-1 | 8.0 | 9.0 | 1.0 | -1.00 |
| | | EX.3-2 | 9.0 | 10.0 | 1.0 | -2.00 |
| | | EX.3-3 | 10.0 | 11.0 | 1.0 | -3.00 |
| | | COM.EX.3 | 8.0 | 8.0 | — | — |

EX. = EXAMPLE
COM.EX. = COMPARATIVE EXAMPLE

FIG. 13

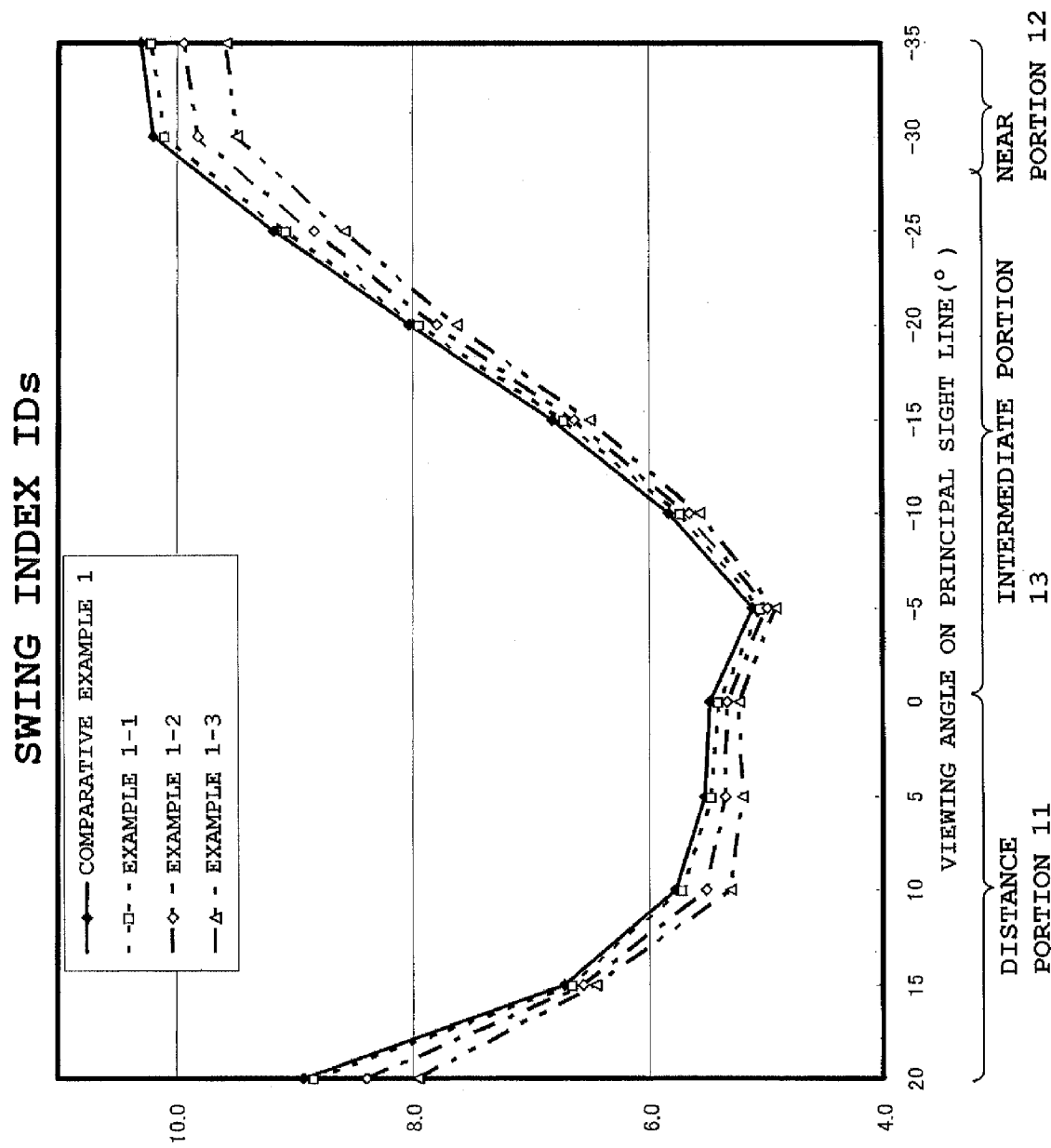

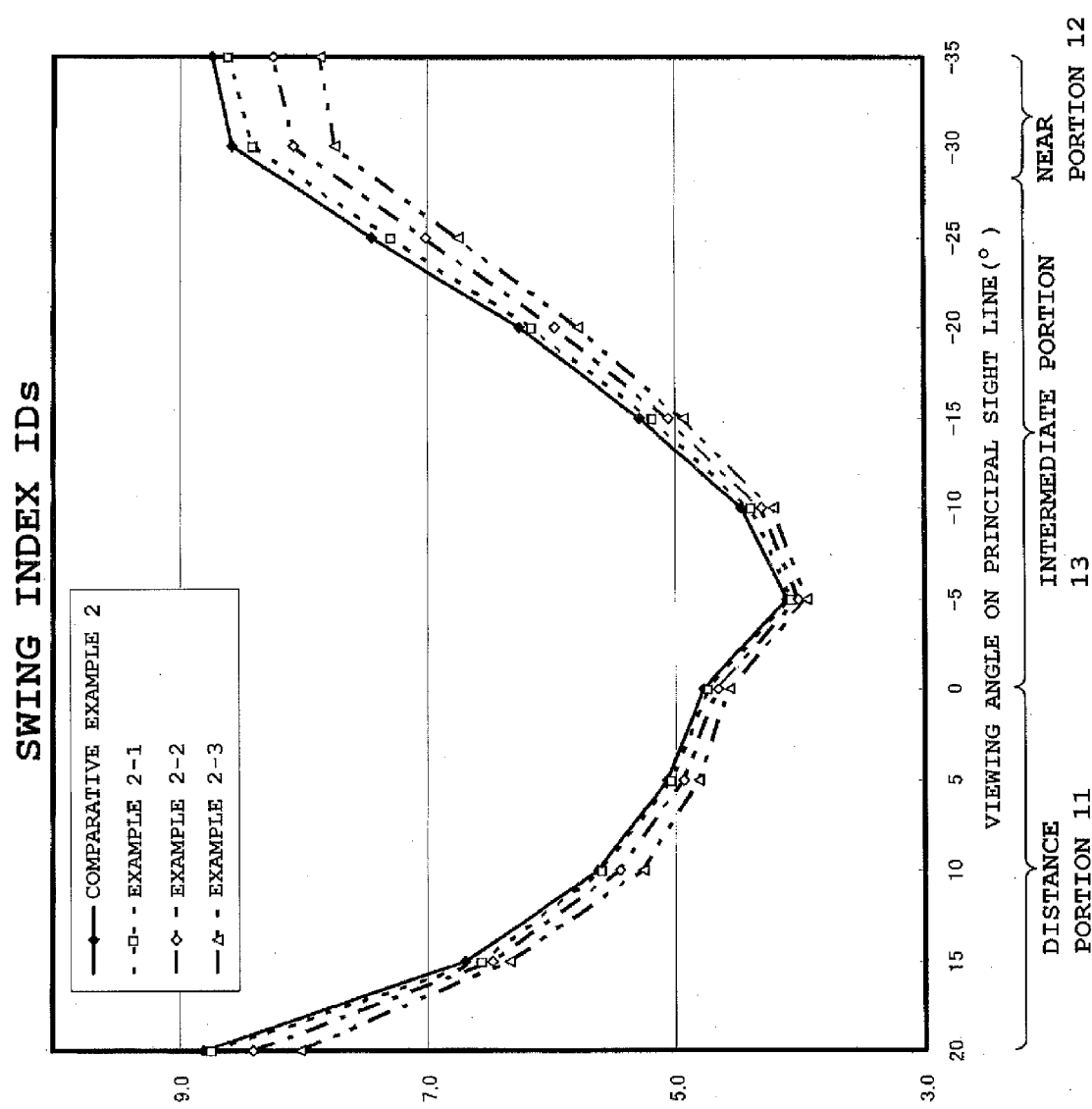

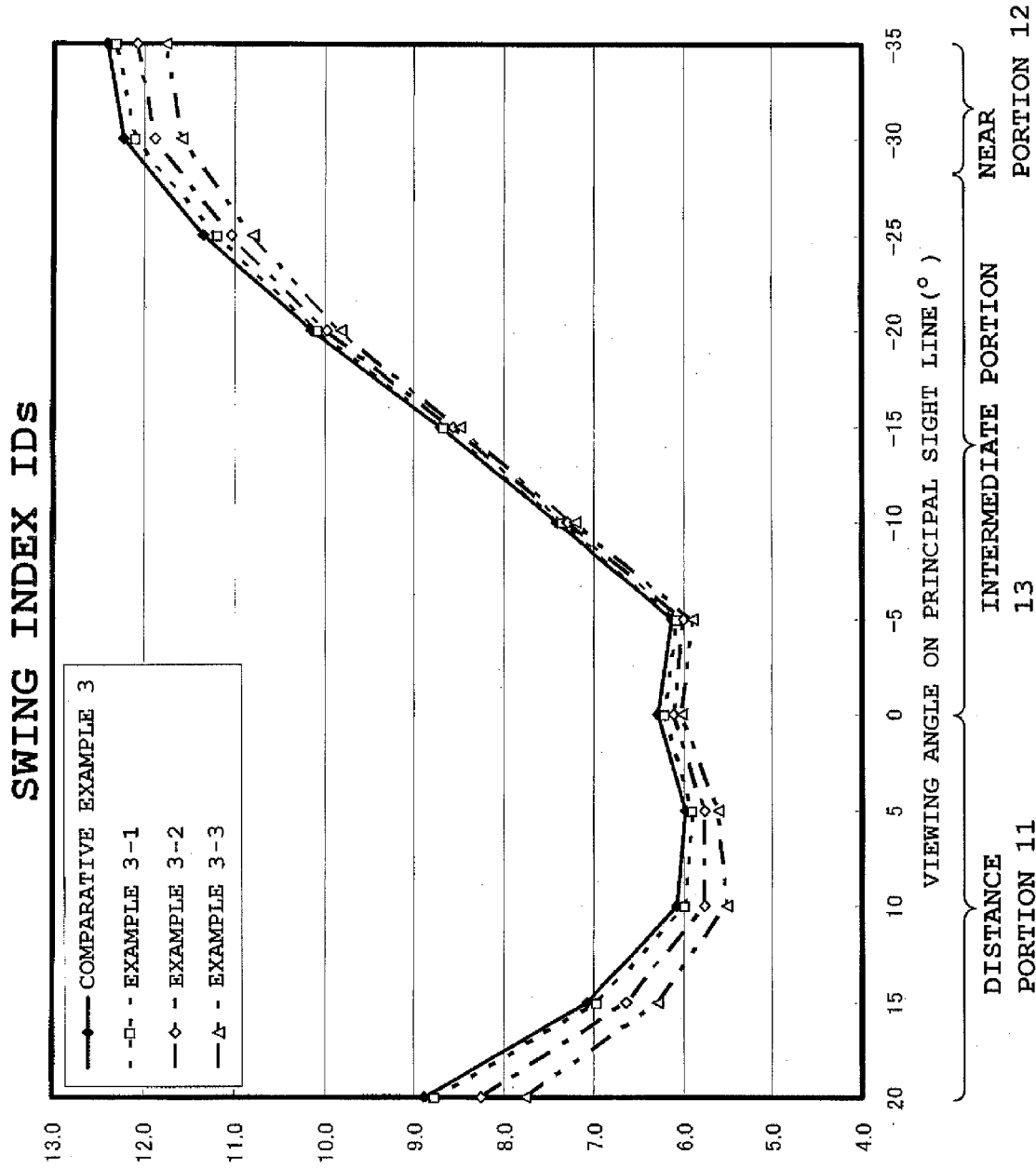

US 9,746,694 B2

LENS SET, METHOD OF DESIGNING LENS AND METHOD OF MANUFACTURING LENS

TECHNICAL FIELD

The present invention relates to a lens set, a method of designing a lens and a method of manufacturing a lens

DESCRIPTION OF RELATED ART

Patent document 1 describes a technique of providing a progressive surface on an eye-side surface instead of on an object-side surface which is conventionally formed a progressive surface, in a progressive multifocal lens used for a spectacle lens suitable for correcting a vision such as presbyopia. Thus, the object-side surface can be formed into a spherical surface with a constant base curve, and therefore variation by a shape factor of magnification can be prevented, difference of magnification between the distance portion and the near portion can be reduced, and the variation of magnification in a progressive portion can be suppressed. Accordingly, swing or distortion of an image by the difference of magnification can be reduced, and the progressive multifocal lens capable of obtaining a comfortable visual field can be provided. Patent document 1 also describes a technique of combining a progressive surface and a toric surface for correcting astigmatism into an eyeball-side surface using a combining formula, and reducing a swing or distortion even in the progressive multifocal lens for correcting astigmatism.

Patent document 2 describes a technique of providing a multifocal lens for spectacles including visual field portions with different powers such as a distance portion and a near portion, and including a specific addition power by mathematically setting a difference between a mean surface power of the distance portion and a mean surface power of a near portion on the object-side surface, to be smaller than the addition power, and adjusting the mean surface power of the distance portion and the mean surface power of the near portion on the eyeball-side surface. The mean surface power on the object-side surface can be adjusted so that the difference of magnification between the distance portion and the near portion can be small, and also difference of mean surface power on the object-side surface can also be small. Accordingly, the multifocal lens with less swing or distortion by the difference of magnification, and capable of obtaining a suitable visual field with wide clear vision area, improved astigmatism, and less swing of an image, can be provided.

Patent document 3 describes a technique of providing a bi-aspherical surface progressive addition lens capable of reducing a difference of magnification of images between a distance portion and a near portion, correcting a vision satisfactorily based on a prescription value, and providing a wide effective visual field with less distortion in an as-worn state. Therefore, patent document 3 describes as follows: when a horizontal surface power and a vertical surface power at distance reference point F1 are respectively defined as DHf and DVf on a first addition surface on the object-side surface, and a horizontal surface power and a vertical surface power at near reference point N1 are respectively defined as DHn and DVn on the first addition surface, a relation formula is satisfied as follows: DHf+DHn<DVf+DVn and DHn<DVn, and a surface astigmatic component at F1 and N1 on the first addition surface is canceled by a second addition surface on the eyeball-side surface, thus providing a distance power and an addition power based on a prescription value by combining the first and second addition surfaces.

Patent document 4 describes a technique of providing a progressive addition lens capable of reducing a distortion or blurring of an image which is inevitably generated in a progressive addition lens, and improving a wearing feeling. Therefore, patent document 4 provides a both-side progressive lens in which both surfaces of an outer surface and inner surface are progressive surfaces, wherein the shape of the progressive surface is designed so that addition for the outer surface is minus, and a mean surface power distribution is similar in the outer surface and the inner surface.

PRIOR ART DOCUMENT

Patent Document

Patent document 1: International Publication No. 97/19382 Pamphlet
Patent document 2: International Publication No. 97/19383 Pamphlet
Patent document 3: Japanese Patent Laid Open Publication No. 2003-344813
Patent document 4: Japanese Patent Laid Open Publication No. 2004-004436

SUMMARY OF THE INVENTION

Problem to be Solved by the Invention

Although improvement of performance is achieved by these techniques, there is still a user who cannot be accustomed to the characteristic of the progressive addition lens and particularly to the swing, and also improvement is requested. In addition, in order to provide a lens having optimal parameter in accordance with a prescription, many kinds of lenses are required to be previously manufactured and prepared, or individually manufactured, and this is a factor of increasing a manufacturing cost.

In view of the above-descried problem, the present invention is provided, and according to several aspects of the present invention, there are provided a lens set, a method of designing a lens and a method of manufacturing a lens, with less swing of an image viewed through a lens and capable of suppressing a manufacturing cost.

Means for Solving the Problem (1) According to an aspect of the present invention, there is provided a lens set which is a progressive addition lens for spectacles, including:
a distance portion and a near portion having different powers, wherein an equivalent spherical power of the distance portion is plus; and
a first lens and a second lens having different addition powers from each other,
wherein in the first lens, an object-side surface includes a toric surface element in which when a horizontal surface power of the distance portion along a vertical reference line or a principal sight line passing through a fitting point is defined as OHPf1, and vertical surface power of the distance portion along the vertical reference line or the principal sight line is defined as OVPf1, and horizontal surface power of the near portion along the vertical reference line or the principal sight line is defined as OHPn1, and vertical surface power of the near portion along the vertical reference line or the principal sight line is defined as OVPn1, the OVPn1 is smaller than the OVPf1, and the OHPf1 is larger than the OVPf1, and the OHPn1 is larger than the OVPn1, and an eyeball-side surface along the vertical reference line or the principal sight line includes an element for cancelling the toric surface element, and also in the second lens, an object-side surface includes a toric surface element in which when a horizontal surface power of the distance portion along a vertical reference line or a principal sight line passing through a fitting point is defined as OHPf2, and vertical surface power of the distance portion along the vertical reference line or the principal sight line is defined as OVPf2, horizontal surface power of the near portion along the vertical reference line or the principal sight line is defined as OHPn2, and vertical surface power of the near portion along the vertical reference line or the principal sight line is defined as OVPn2, the OVPn2 is smaller than the OVPf2, and the OHPf2 is larger than the OVPf2, and the OHPn2 is larger than the OVPn2, and an eyeball-side surface along the vertical reference line or the principal sight line includes an element for cancelling the toric surface element, and a difference between the OVPf1 and the OVPn1, and a difference between the OVPf2 and the OVPn2 are the same.

Namely, the first lens and the second lens satisfy the following conditions.

$$OHPf1 > OVPf1, OHPf2 > OVPf2 \quad (1)$$

$$OHPn1 > OVPn1, OHPn2 > OVPn2 \quad (2)$$

$$OVPf1 > OVPn1, OVPf2 > OVPn2 \quad (3)$$

The first lens and the second lens are progressive addition lenses including a toric surface (called a troidal surface) element along a vertical reference line or a principal sight line (both of them called a "principal meridian") passing through a fitting point on an object-side surface (outer surface). The toric surface element on the object-side surface is the element in which horizontal surface power OHPf1 (OHPf2) and surface power OHPn1 (OHPn2) are larger than vertical surface power OVPf1 (OVPf2) and surface power OVPn1 (OVPn2) in both of the distance portion and the near portion (conditions (1) and (2)). Namely, in both of the distance portion and the near portion, horizontal curvature (in horizontal direction) is larger than vertical curvature (in vertical direction) on the object-side surface in both of the distance portion and the near portion. Thus, the progressive addition lens with less swing can be provided.

Namely, a typical movement of a sight line (eye) when swing is generated in an image obtained through the first lens or the second lens, is caused by movement of an eyeball (sight line) with respect to a head, by vestibule-ocular reflex that compensates the movement of the head. A moving range of the sight line by the vestibule-ocular reflex, is generally wide in the horizontal direction (lateral direction). Accordingly, by introducing the toric surface element on the object-side surface in which a horizontal surface power is larger than a vertical surface power, variation of an angle formed when the sight line passes through the object-side surface of a spectacle lens, can be suppressed when the sight line moves in the horizontal direction.

Therefore, various aberrations of the image obtained through the first lens or the second lens can be reduced when the sight line is moved, and the first lens and the second lens with less swing of the image obtained through the first lens or the second lens, can be provided.

The first lens and the second lens are capable of reducing a difference of magnification between the image obtained through the distance portion and the image obtained through the near portion of the progressive addition lens, by including a degressive element in which the surface power of the near portion on the object-side surface is smaller than the surface power of the distance portion reversely to the addition power (condition (3)).

The degressive element on the object-side surface may be introduced by both of the vertical surface power and the horizontal surface power. However, a structure on the object-side surface becomes complicated. Therefore, the degressive element is preferably introduced on the object-side surface by such a small vertical surface power. Thus, the progressive addition lens with less swing of image, can be provided at a low cost.

Further, the difference between surface power OVPf1 and surface power OVPn1 of the first lens, and the difference between surface power OVPf2 and surface power OVPn2 of the second lens are the same, irrespective of the addition power of the lens, and therefore the shape of the object-side surface (outer surface) can be easily formed in common. Thus, a plurality of kinds of lenses having different addition powers can be manufactured from a common semifinished lens, and therefore a manufacturing cost can be suppressed.

(2) According to an aspect of the present invention, there is provided a method of designing a lens, which is a progressive addition lens for spectacles, including:

a distance portion and a near portion having different powers, wherein an equivalent spherical power of the distance portion is plus; and a first lens and a second lens having different addition powers from each other, wherein in the first lens, an object-side surface includes a toric surface element in which when a horizontal surface power of the distance portion along a vertical reference line or a principal sight line passing through a fitting point is defined as OHPf1, and vertical surface power of the distance portion along the vertical reference line or the principal sight line is defined as OVPf1, and horizontal surface power of the near portion along the vertical reference line or the principal sight line is defined as OHPn1, and vertical surface power of the near portion along the vertical reference line or the principal sight line is defined as OVPn1, the OVPn1 is smaller than the OVPf1, and the OHPf1 is larger than the OVPf1, and the OHPn1 is larger than the OVPn1, and an eyeball-side surface along the vertical reference line or the principal sight line includes an element for cancelling the toric surface element, and also in the second lens, an object-side surface includes a toric surface element in which when a horizontal surface power of the distance portion along a vertical reference line or a principal sight line passing through a fitting point is defined as OHPf2, and vertical surface power of the distance portion along the vertical reference line or the principal sight line is defined as OVPf2, and horizontal surface power of the near portion along the vertical reference line or the principal sight line is defined as OHPn2, and vertical surface power of the near portion along the vertical reference line or the principal sight line is defined as OVPn2, the OVPn2 is smaller than the OVPf2, and the OHPf2 is larger than the OVPf2, and the OHPn2 is larger than the OVPn2, and an eyeball-side surface along the vertical reference line or the principal sight line includes an element for cancelling the toric surface element, and a difference between the OVPf1 and the OVPn1, and a difference between the OVPf2 and the OVP2 are the same.

According to the first lens and the second lens designed by this method, the variation of the angle formed when the sight line passes through the object-side surface of the first lens or the second lens, can be suppressed when the sight line moves in the horizontal direction, by introducing the toric surface element on the object-side surface in which the horizontal surface power is larger than the vertical surface power. Accordingly, various aberrations of the image can be reduced, the image being obtained through the first lens or the second lens when the sight line is moved, and the first lens and the second lens with less swing of image can be designed, the image being obtained through the first lens or the second lens.

Further, the difference between surface power OVPf1 and surface power OVPn1 of the first lens, and a difference between surface power OVPf2 and surface power OVPn2 of the second lens are the same, and therefore the shape of the object-side surface (outer surface) can be easily formed in common. Accordingly, a plurality of kinds of lenses having different addition powers can be manufactured from the common semifinished lens, and therefore the lens capable of suppressing the manufacturing cost can be designed.

(3) The method of manufacturing a lens according to an aspect of the present invention includes manufacturing a progressive addition lens designed by the abovementioned method of designing a lens.

Thus, a plurality of kinds of lenses having different addition powers can be manufactured from the common semifinished lens, and therefore the manufacturing cost can be suppressed.

BRIEF DESCRIPTION OF THE DRAWINGS

FIG. 4 is a view showing a lens set according to an embodiment.

FIG. 13 is a table showing parameters in examples and comparative examples.

FIG. 20 is a graph showing a swing index IDs of example 1-1 to example 1-3 and comparative example 1.

FIG. 25 is a graph showing swing indexes IDs of example 2-1 to example 2-3 and comparative example 2.

FIG. 30 is a graph showing swing indexes IDs of example 3-1 to example 3-3 and comparative example 3.

DETAILED DESCRIPTION OF THE INVENTION

Figure 1:
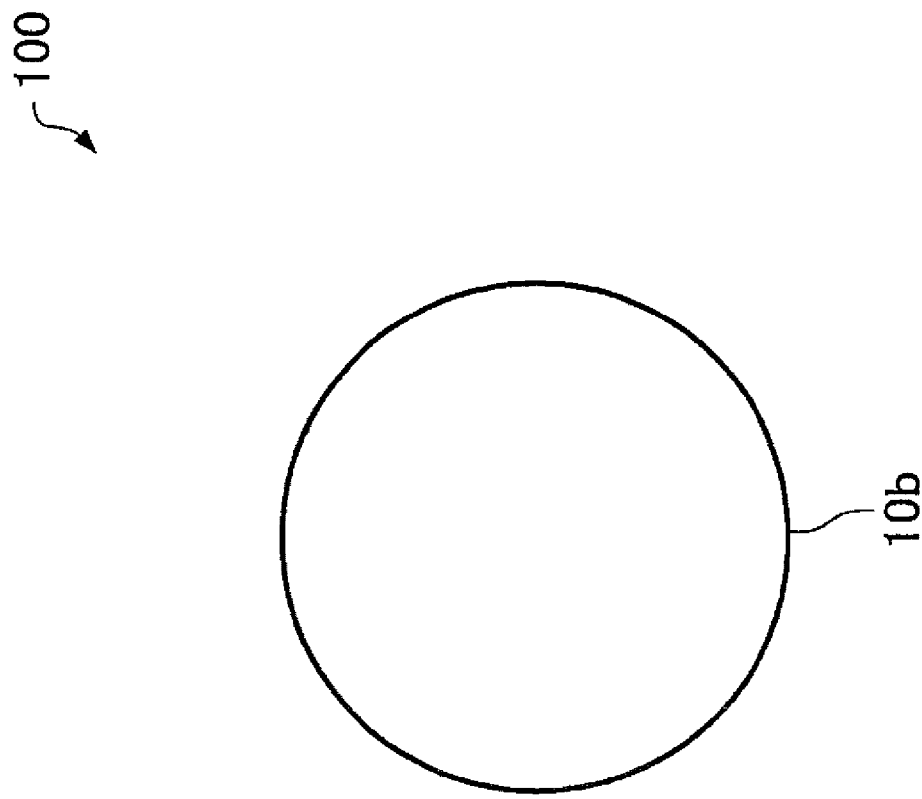
FIG. 1 is a view schematically showing a lens set 100 according to an embodiment.

Preferable embodiments of the present invention will be described hereafter in detail, using the drawings. The embodiments described hereafter, don't unjustly limit the contents of the present invention described in the claims. Further, all of the structures described hereafter should not necessarily be taken as essential constituting features of the present invention.

The embodiments of the present invention will be described hereafter in the following order.
0. Explanation for terms
1. Lens set
2. A method of designing a lens and a method for manufacturing a lens
3. Evaluation method of swing
4. Example

0. EXPLANATION FOR TERMS

Main terms used for the description of the present invention will be described.

"An upper side" of a lens means a head top side of a wearer when wearing a spectacle by a user.

"A lower side" of a lens means a chin side of a wearer when wearing a spectacle by a user.

"An outer surface" of a lens means a surface opposed to an object when wearing a spectacle by a wearer, which is also called "an object-side surface" and "a convex surface".

"An inner surface" of a lens means a surface opposed to an eyeball of the wearer when wearing the spectacle by the wearer, which is also called "an eyeball-side surface" and "a concave surface".

"A distance portion" of a lens is a visual field part for viewing an object in a long distance (for a distance view).

"A near portion" of a lens is a visual field part for viewing an object in a short distance (for a near view), in which a diopter (power) is different from that of the distance portion.

"An intermediate portion" of a lens is an area for connecting the distance portion and the near portion so that the power is continuously varied, which is also called a portion for an intermediate view, a progressive portion, and an intermediate corridor.

"A distance portion on an outer surface (inner surface)" is an area on the outer surface (inner surface) corresponding to the distance portion of a lens.

"A near portion on an outer surface (inner surface)" is an area on the outer surface (inner surface) corresponding to the near portion of a lens.

"An intermediate portion on an outer surface (inner surface)" is an area on the outer surface (inner surface) corresponding to the intermediate portion of a lens.

"A distance reference point" means a coordinate on the outer surface or the inner surface of a lens in which a designing specification of the distance portion is used. Note that the distance reference point may also include a minute area, although the area is a "point".

"A near reference point" means a coordinate on the outer surface or the inner surface of a lens in which a designing specification in a near portion of a lens is used. Note that the near reference point may also include a minute area, although the area is a "point".

"A surface power of a distance portion" means a surface power at a distance reference point.

"A surface power of a near portion" means a surface power at a near reference point.

"Power" of a lens means an equivalent spherical power at the distance reference point.

"A base curve" means a curvature of the outer surface of a lens.

"A primary position" means a relative position of an eyeball with respect to a head of a wearer when facing up to an object in front at a height of an eyeball of a wearer.

"A fitting point" means a coordinate indicated by a designer of a lens, as an intersection point of a sight line of the wearer at the primary position and the outer surface of the lens.

"The same" power means a case that power is within an allowable range of an error, in addition to a case that two powers to be compared are completely equal to each other. Specifically, allowance of the progressive addition lens defined in "JIS T 7315: PROGRESSIVE ADDITION SPECTACLE LENS FOR POWER CORRECTION" (Japanese Industrial Standards Committee) is 0.25 D as an absolute value, and therefore a value less than 0.25 D is in a range of error.

1. LENS SET

FIG. 1 is a view schematically showing a lens set 100 according to an embodiment. The lens set 100 of this embodiment includes a distance portion and a near portion having different powers, and is the progressive addition lens for spectacles with plus equivalent spherical power of the distance portion, and includes a first lens 10a and a second lens 10b having mutually different addition powers. In an example shown in FIG. 1, two lenses are included in the lens set 100, but the lens set 100 may be constituted including three or more lenses. When the lens set 100 is constituted including three or more lenses, arbitrarily selected two lenses may correspond to the first lens 10a and the second lens 10b. Also, the lens set 100 may include two or more first lens 10a or second lens 10b.

Figure 2:
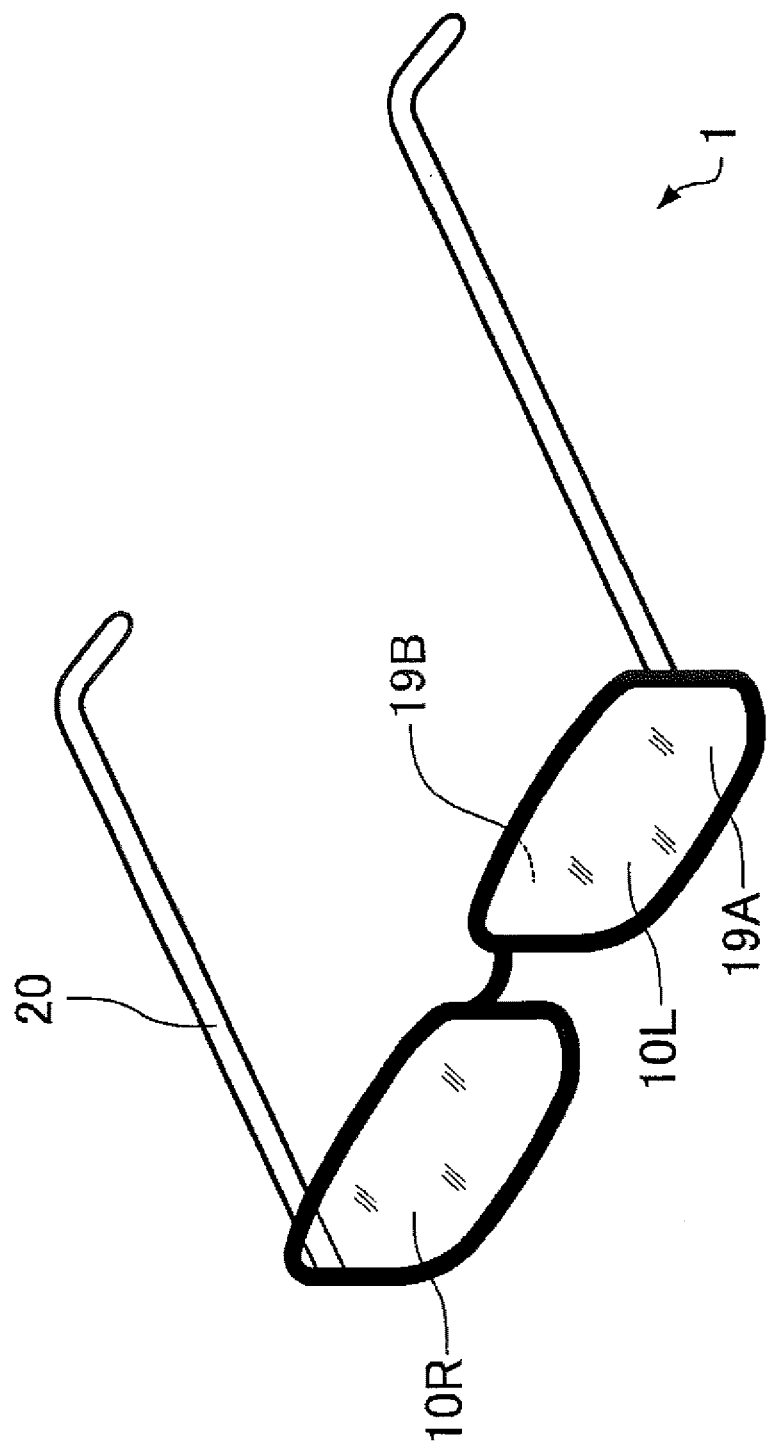
FIG. 2 is a perspective view showing an example of a spectacle using a lens included in the lens set 100.

FIG. 2 is a perspective view showing an example of a spectacle 1 using the lens included in the lens set 100.

In this embodiment, explanation is given for a spectacle 1 in which a left side is left and a right side is right viewed from a user side (wearer side or eyeball side). The spectacle 1 has right and left pair of spectacle lenses 10L and 10R for right eyes and left eyes, and a spectacle frame 20 into which the lens 10L and the lens 10R are respectively settled. The lens 10L and the lens 10R shown in FIG. 2 are the lenses obtained by processing the first lens 10a or the second lens 10b to fit in a frame 20. Additions of the lens 10L and the lens 10R may be the same or may be different from each other. However, it is general to set the same additions of the lens 10L and the lens 10R. Both of the lens 10L and the lens 10R of this embodiment are the first lens 10a. The lens 10L and the lens 10R are respectively a progressive multifocal lens (progressive addition lens). The lens 10L and the lens 10R are meniscus lenses whose basic shape is a convex to an object-side. Accordingly, the lens 10L and the lens 10R respectively include an object-side surface (convex surface, also called an outer surface) 19A and an eyeball-side (user side) surface (concave surface, also called an inner surface) 19B. Note that the lens 10L and the lens 10R are selected in accordance with a prescription of a user, and therefore prescription power and prism amount, etc., may be different.

Figure 3B:
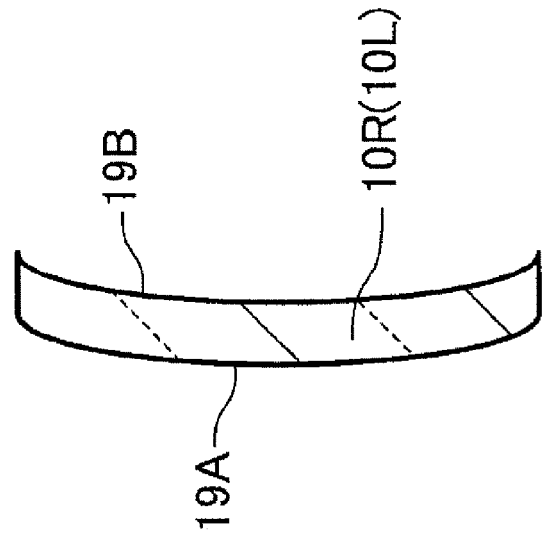
FIG. 3 (*a*) is a schematic view of a lens 10R for right eye viewed from an eyeball-side, and FIG. 3 (*b*) is a view schematically showing a sectional surface of the lens 10R for right eye.
Figure 3A:
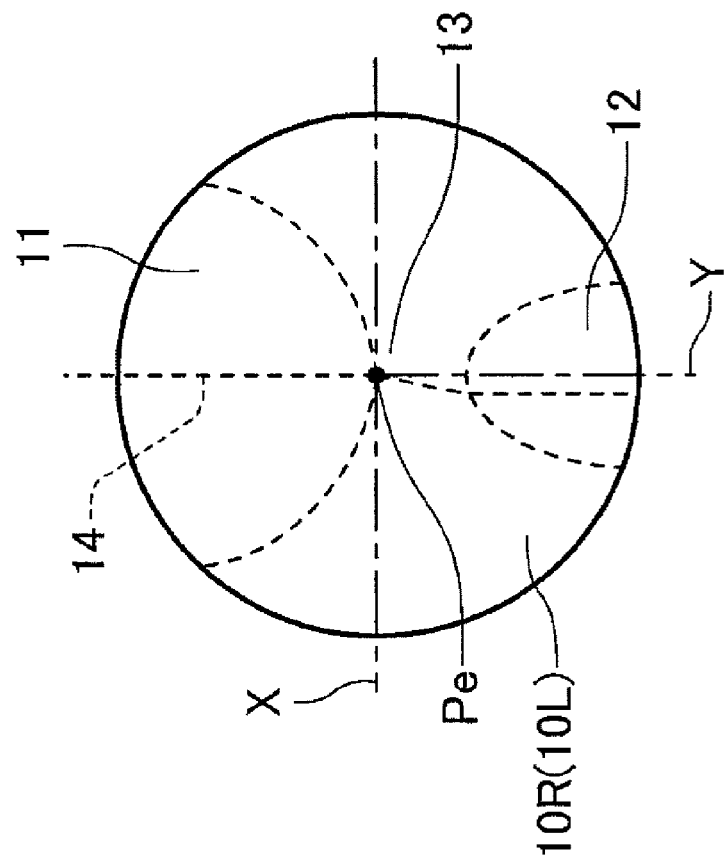

FIG. 3(a) is a schematic view of the lens 10R for right eye viewed from the eyeball-side, and FIG. 3(b) is a view schematically showing a sectional surface of the lens 10R for right eye. The lens 10R includes a distance portion 11 in an upper side, and includes a near portion 12 in a lower side. Further, the lens 10R includes an intermediate portion 13 connecting the distance portion 11 and the near portion 12. Also, the lens 10R includes a principal sight line 14 connecting positions on a lens, which are centers of a visual field in a case of a distance vision, an intermediate vision, and a near vision. A fitting point Pe is usually positioned almost at a lower end of the distance portion 11, which is a reference point on a lens through which a sight line passes in a case of a distance horizontal front view (primary position) when an outer periphery of the lens 10R is molded to fit and settle in the frame. Hereafter, the fitting point Pe is set as a coordinate origin of a lens, and a coordinate in a direction along a horizontal reference line 15 is set as x-coordinate, and a coordinate in a direction along a vertical reference line is y-coordinate. The principal sight line 14 extends almost vertically in a direction of the near portion 12 from the distance portion 11, and is curved to a nose side from a point passing through the fitting point Pe.

Explanation is given hereafter mainly for the lens 10R for right eyes as a lens. However, the lens may be the lens 10L for left eyes, and basically the lens 10L for left eyes has a right and left symmetric structure with respect to the lens 10R for right eyes, excluding a difference of a spectacle specification between right and left eyes. Further, hereafter, the lens 10R for right eye and the lens 10L for left eye are called a lens 10 in common. Also, hereafter, the surface power of the lens 10 is expressed as OVPf, OVPn, OHPf, OHPn, IVPf, IVPn, IHPv, and IHPn respectively.

A range of the visual field in optical performances of the lens 10 can be known by an astigmatism distribution view and an equivalent spherical power distribution view. The swing felt by a user when wearing the lens 10 and moving a head, is important and given as one of the performances of the lens 10, and a difference is sometimes generated in the swing, even if the astigmatism distribution and the equivalent spherical power distribution are almost the same. Explanation is given hereafter for an evaluation method of the swing in "3. Evaluation method of swing", and a result of comparing the example of the present application and the comparative example using the evaluation method, is shown in "4. Example".

In the first lens 10a of the lens set 100, an object-side surface 19A includes a toric surface element in which when a horizontal surface power in a distance portion 11 along a principal sigh line 14 (or a vertical reference line passing through a fitting point Pe (a vertical reference line (called a "vertical reference line" hereafter)) is defined as OHPf1, and a vertical surface power in the distance portion 11 along the principal sight line (or the vertical reference line) is defined as OVPf1, and a horizontal surface power in a near portion 12 along the principal sight line 14 (or the vertical reference line) is defined as OHPn1, and a vertical surface power in the near portion 12 along the principal sight line 14 (or the vertical reference line) is defined as OVPn1, OVPn1 is smaller than OVPf1, and OHPf1 is larger than OVPf1, and OHPn1 is larger than OVPn1, and the eyeball-side surface 19B along the principal sight line 14 (or the vertical reference line) includes an element for canceling the toric surface element.

In the second lens 10b of the lens set 100, the object-side surface 19A includes a toric surface element in which when a horizontal surface power in the distance portion 11 along the principal sigh line 14 (or the vertical reference line) is defined as OHPf2, and a vertical surface power in the distance portion 11 along the principal sight line (or the vertical reference line) is defined as OVPf2, and a horizontal surface power in the near portion 12 along the principal sight line 14 (or the vertical reference line) is defined as OHPn2, and a vertical surface power in the near portion 12 along the principal sight line 14 (or the vertical reference line) is defined as OVPn2, OVPn2 is smaller than OVPf2, and OHPf2 is larger than OVPf2, and OHPn2 is larger than OVPn2, and the eyeball-side surface 19B along the principal sight line 14 (or the vertical reference line) includes an element for canceling the toric surface element.

Namely, the first lens 10a and the second lens 10b satisfy the following conditions.

$$OHPf1>OVPf1, OHPf2>OVPf2 \quad (1)$$

$$OHPn1>OVPn1, OHPn2>OVPn2 \quad (2)$$

$$OVPf1>OVPn1, OVPf2>OVPn2 \quad (3)$$

The first lens 10a and the second lens 10b are bi-aspherical addition lenses including the toric surface (also called a troidal surface) element along the principal sight line on the object-side surface 19A. The toric surface element on the object-side surface 19A is the element in which horizontal surface power OHPf1 (OHPf2) and horizontal surface power OHPn1 (OHPn2) are larger than vertical surface power OVPf1 (OVPf2) and vertical surface power OVPn1 (OVPn2) in both of the distance portion 11 and the near portion 12 (Conditions (1) and (2)).

Therefore, the intermediate portion 13 also includes a similar toric surface element. Namely, horizontal (horizontal direction) curvature is larger than vertical (vertical direction) curvature on the object-side surface 19A in both of the distance portion and the near portion 12. Thus, the progressive addition lens with small swing can be provided. Note that the intermediate portion 13 may also include the similar toric surface element as the distance portion 11 and the near portion 12.

A typical movement of a sight line (eye) when generating the swing in an image obtained through the first lens 10a or the second lens 10b, is caused by the movement of the eyeball (sight line) with respect to a head by vestibule-ocular reflex for compensating the movement of the head. Such a visual movement range by the vestibule-ocular reflex is generally wider in the horizontal direction than the vertical direction. Accordingly, by introducing the toric surface element on the object-side surface 19A in which the horizontal surface power is larger than the vertical surface power, a variation of angles formed when the sight line passes through the object-side surface 19A of the first lens 10a or the second lens 10b, can be suppressed when the sight line moves in the horizontal direction.

Therefore, various aberrations of the image obtained through the first lens 10a or the second lens 10b can be reduced when moving the sight line, and the first lens 10a and the second lens 10b with less swing of image obtained through the first lens 10a or the second lens 10b, can be provided.

The first lens 10a and the second lens 10b are capable of reducing a difference of magnification between the image obtained through the distance portion 11 and the image obtained through the near portion 12, by introducing a degressive element for making the surface power in the near portion 12 smaller than the surface power in the distance portion 11 on the object-side surface 19A, in such a manner as being reverse to addition (condition (3)).

The degressive element on the object-side surface 19A may be introduced by both of the vertical surface power and the horizontal surface power. However, the structure on the object-side surface 19A is complicated. Generally, a spectacle lens is manufactured in accordance with a prescription of a wearer, by previously manufacturing a lens (semifinished lens) in which one surface (usually an outer surface) is completed, and thereafter edging and grinding the other surface (usually an inner surface) in accordance with a design. If the structure on the object-side surface 19A is complicated, many man-hours are required for ensuring an edging accuracy of the semifinished lens, and therefore the degressive element is preferably introduced on the object-side surface 19A by small vertical surface power which allows easy edging with high precision. Thus, the progressive addition lens with less swing of image can be provided at a low cost.

Further, addition powers of the first lens 10a and the second lens 10b can be ensured by setting a difference between the surface power in the distance portion 11 and the surface power in the near portion 12 on the object-side surface 19B, to be larger than the difference between the surface power in the distance portion 11 and the surface power in the near portion 12 on the object-side surface 19A. Namely, when a vertical surface power in the distance portion 11 is defined as IVPf1, and a vertical surface power in the near portion 12 is defined as IVPn1 on the eyeball-side surface 19B along the principal sight line 14 (or the vertical reference line) of the first lens 10a, and when a vertical surface power in the distance portion 11 is defined as IVPf2, and a vertical surface power in the near portion 12 is defined as IVPn2 on the eyeball-side surface 19B along the principal sight line 14 (or the vertical reference line) of the second lens 10b, the following condition is satisfied.

$$IVPf1-IVPn1>OVPf1-OVPn1, IVPf2-IVPn2>OVPf2-OVPn2 \quad (4)$$

Wherein, surface powers IVPF1, IVPf2, IVPn1, and IVPn2 in condition (4) are absolute values.

Further, in the first lens 10a and the second lens 10b of this embodiment, the difference between surface power OVPf1 and surface power OVPn1 of the first lens 10a, and the difference between surface power OVPf2 and surface power OVPn2 of the second lens 10b are the same.

FIG. 4 is a view showing the lens set of this embodiment. The vertical axis indicates a spherical power (Sph) in the distance portion, and the horizontal axis indicates a prescription addition power (Add) of the lens 110. Generally, the progressive addition lens is divided into a plurality of groups in an allowable range regarding an optical performance such as astigmatism and a mechanical performance such as a thickness, etc., based on a prescription (at least spherical power and addition power in the distance portion). The lens included in each lens set is edged from a common semifinished lens. In this embodiment, G4 to G11 respectively indicates the lens set manufactured from the common (the same-shaped) semifinished lens. Namely, degressive elements (condition (3)) of the first lens 10a and the second lens 10b included in each lens set are the same. For example, lens set G5 includes the first lens 10a satisfying Sph: +2.50 D, and Add: 1.00 D, and the second lens 10b satisfying Sph: +1.00 D and Add: 2.00 D, wherein difference between OVPf1 and OVPn1 and difference between OVPf2 and OVPn2 are the same.

Here, if the addition power of the first lens 10a is assumed to be smaller than the addition power of the second lens 10b, the swing of the image in the first lens 10a and the second lens 10b can be suppressed in a certain degree of range by setting an amount of the degressive element for the second lens 10b to be larger than a size of the degressive element for the first lens 10a. Meanwhile, in the lens 10 of this embodiment, if the amount of the degressive element for the second lens 10b is set to be smaller than the degressive element for the first lens 10a, the curvature of the object-side surface 19A of the second lens 10b can be prevented from being relatively large. Namely, a protrusion degree of the object-side surface 19A of the second lens 10b can be reduced, and therefore an outer appearance as a spectacle can be improved. Namely, swing or the outer appearance of the lens can be improved by including the degressive element for a different amount in response to the addition power.

However, if the degressive element is varied in response to the addition power, the curvature of the object-side surface 19A is varied in response to the addition power, and the common semifinished lens cannot be used. Accordingly, the lens set in FIG. 4 is required to be further finely divided for each prescribed addition power (Add).

Meanwhile, in the lens set of this embodiment, the difference between surface power OVPf1 and surface power OVPn1 of the first lens 10a, and the difference between surface power OVPf2 and surface power OVPn2 of the second lens 10b are the same, irrespective of the addition power of the lens. Therefore, the shape of the object-side surface 19A can be easily formed into a common shape. Thus, a plurality of kinds of different lenses having different addition powers and different spherical powers can be manufactured from the same kinds of semifinished lenses as the inner surface progressive lens in which the object-side surface 19A is formed into a spherical surface. Therefore, a manufacturing cost can be suppressed to the same as the manufacturing cost of the conventional lens.

Further, in the lens sets G4 to G11 as a whole, the degressive element may be the same. In this case, the whole body of FIG. 4 can be regarded as one lens set, and this lens set is divided into a group of G4 to G11 (having different semifinished lens) based on the prescription. For example, one lens set may be constituted by the first lens 10a having Sph of +2.5 and Add of 1.00 D (included in the lens set G5), and the second lens 10b having Sph of +2.50 D and Add of 1.25 D (included in the lens set G6). Thus, there is no necessity for considering the difference of the degressive element in designing and manufacturing the lens 10, and therefore generation of a defective product can be suppressed, which is caused by design error or edging calculation error during manufacture, or selection error of a jig, etc. Accordingly, the manufacturing cost can be suppressed.

2. A METHOD OF DESIGNING A LENS AND A METHOD OF MANUFACTURING A LENS

Figure 5:
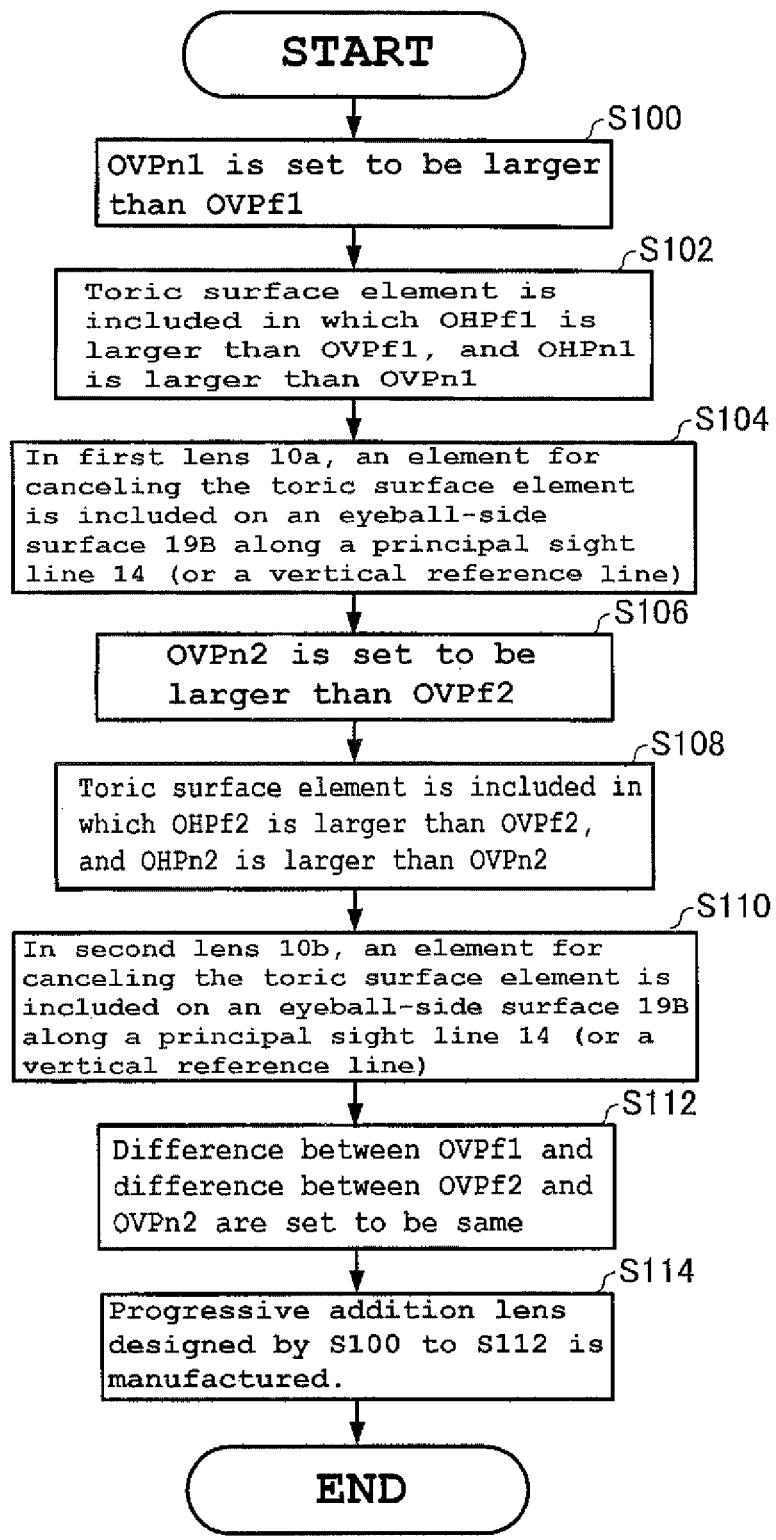
FIG. 5 is a flowchart for describing a method of designing a lens and a method of manufacturing a lens according to an embodiment.

FIG. 5 is a flowchart for describing a method of designing a lens and a method of manufacturing a lens according to this embodiment. In this embodiment, explanation is given for an example of designing and manufacturing the first lens 10a and the second lens 10b described in "1. Lens set".

The method of designing a lens according to this embodiment includes the steps of: including a toric surface element in an object-side surface of the first lens 10a in which surface power OVPn1 is smaller than surface power OVPf1 (step S100), and surface power OHPf1 is larger than surface power OVPf1 and surface power OHPn1 is larger than surface power OVPn1 (step S102); and including an element for canceling the toric surface element in the eyeball-side surface 19B of the first lens 10a along the principal sight line 14 (or the vertical reference line) (step S104), also including a toric surface element in an object-side surface of the second lens 10b in which surface power OVPn2 is smaller than surface power OVPf2 (step S106), and surface power OHPf2 is larger than surface power OVPf2 and surface power OHPn2 is larger than surface power OVPn2 (step S108), and including an element for canceling the toric surface element in the eyeball-side surface 19B of the second lens 10b along the principal sight line 14 (or the vertical reference line) (step S110), and setting the difference between surface power OVPf1 and surface power OVPn1 and the difference between surface power OVPf2 and surface power OVPf2 to be the same (step S112). Note that an order of each step of step S100 to step S112 is arbitrarily selected.

According to the first lens 10a and the second lens 10b designed by this method, by introducing the toric surface element on the object-side surface 19A in which the horizontal surface power is larger than the vertical surface power, the variation of the angle formed when the sight line passes through the object-side surface 19A of the first lens 10a or the second lens 10b can be suppressed when the sight line moves in the horizontal direction. Accordingly, various aberrations of the image obtained through the first lens 10a or the second lens 10b can be reduced when the sight line moves, and the first lens 10a and the second lens 10b with less swing of image obtained through the first lens 10a or the second lens 10b, can be designed.

Further, the difference between surface power OVPf1 and surface power OVPn1 of the first lens 10a, and the difference between surface power OVPf2 and surface power OVPn2 of the second lens 10b, are the same, and therefore the object-side surface 19A can be easily formed into a common shape. Accordingly, a plurality of kinds of different lenses having different addition powers can be manufactured from the common semifinished lens and therefore the lens capable of suppressing the manufacturing cost can be designed.

The method of manufacturing a lens according to this embodiment includes the step of manufacturing a progressive addition lens designed by the abovementioned method of designing a lens (step S100 to step S112) (step S102).

Thus, a plurality of kinds of lenses having different addition powers can be manufactured from the common semifinished lens, and therefore the manufacturing cost can be suppressed.

3. EVALUATION METHOD OF SWING

Figure 6A:
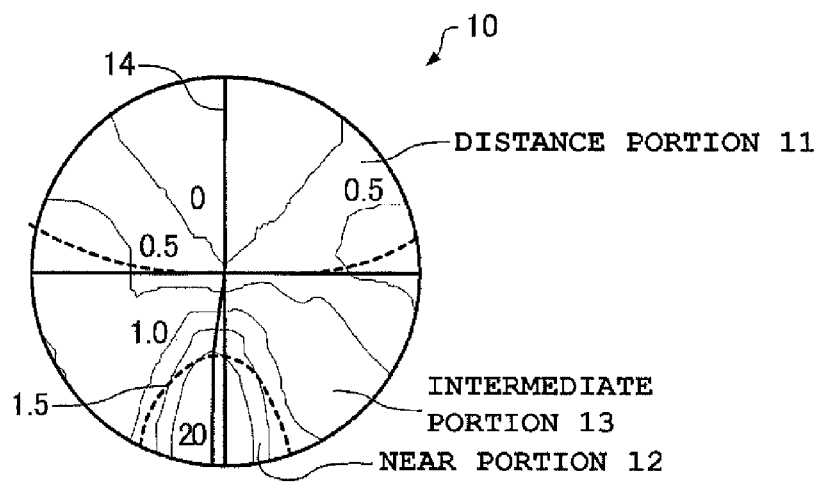
FIG. 6 (*a*) is a view showing an equivalent spherical power distribution (unit is dioptre (D)) of a typical progressive addition lens (lens 10), FIG. 6(*b*) is a view showing an astigmatism distribution (unit is dioptre (D)), and FIG. 6(*c*) is a view showing a state of a distortion when viewing square grids through the lens 10.
Figure 6B:
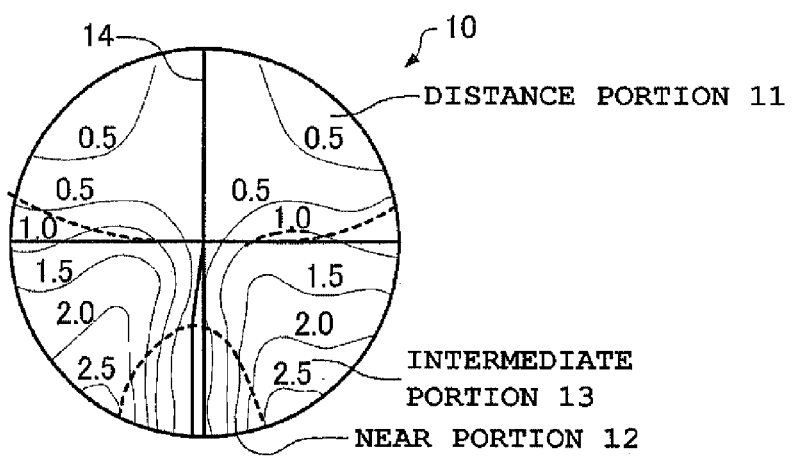
Figure 6C:
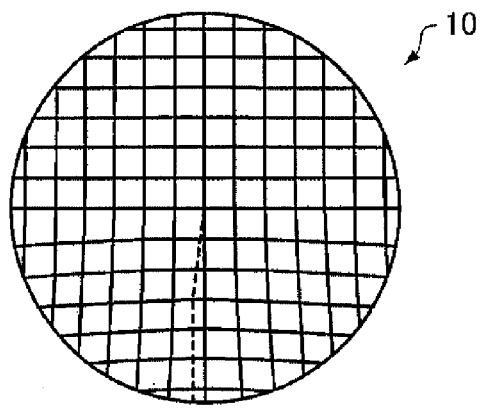

FIG. 6(a) is a view showing an equivalent spherical power distribution (unit is dioptre (D)) of a typical progressive addition lens (lens 10), FIG. 6(b) is a view showing an astigmatism distribution (unit is dioptre (D)), and FIG. 6(c) is a view showing a state of distortion when viewing square grids through the lens 10. In the lens 10, a specific power is added along the principal sight line 14. A large astigmatism is generated in the side part of the intermediate portion 13 by addition of the power, and therefore an object is blurred in the side part of the intermediate portion 13. In the equivalent spherical power distribution, power is increased by a specific amount in the near portion 12, and the power is sequentially reduced toward the intermediate portion 13 and the distance portion 11. In the lens 10 shown in FIG. 6(a) and FIG. 6(b), power (distance power, Sph) is 0.00 D (dioptre), and addition power (Add) is 2.00 D in the distance portion 11.

The magnification of the image becomes large in the near portion 12 having a large power, compared with the image in the distance portion 11, depending on the difference of powers by the position on the lens 10, and the image of each square grid is deformed in the side part of the intermediate portion 13 to the near portion 12. This is the cause of the swing of the image when moving the head.

Figure 7:
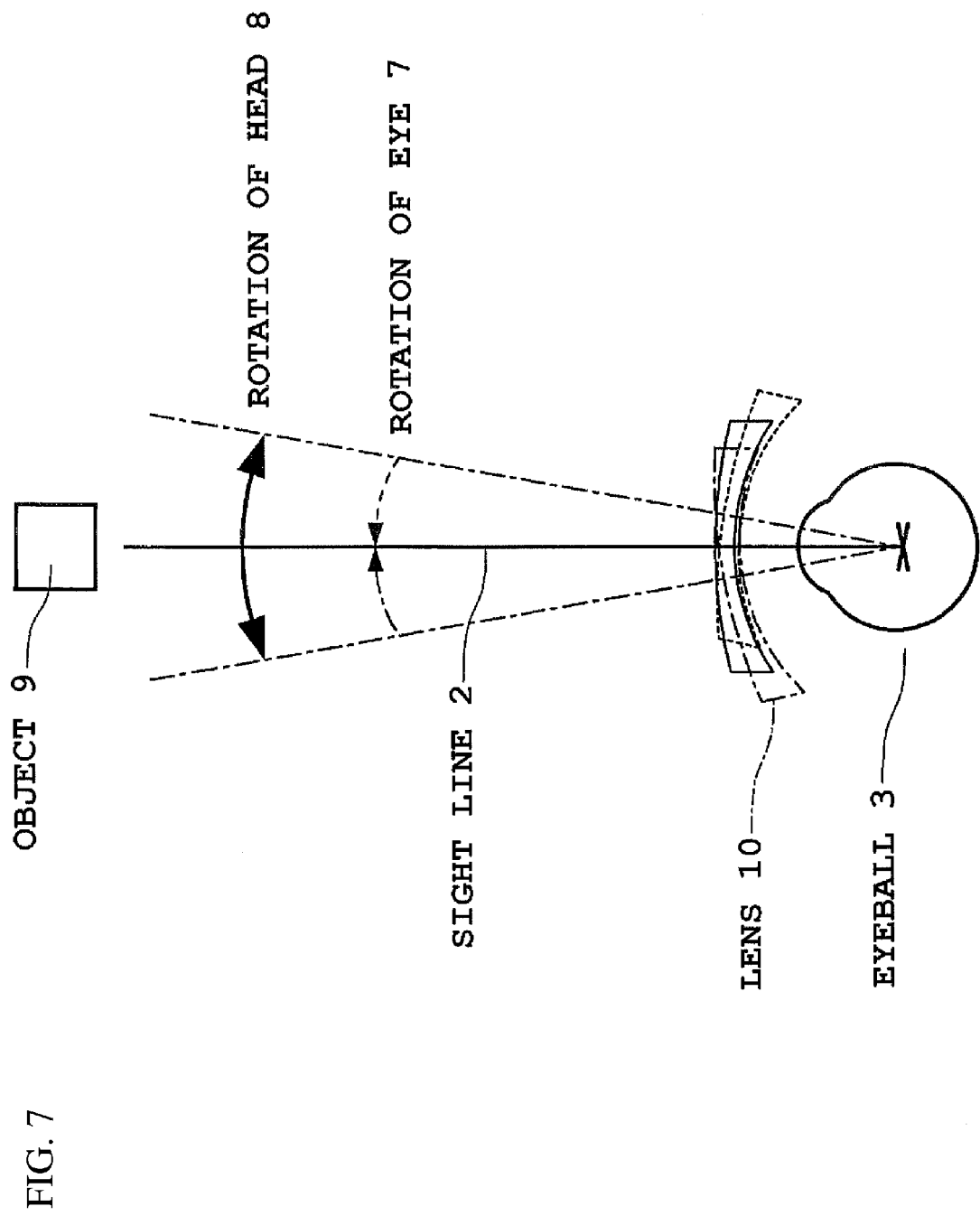
FIG. 7 is a view showing an outline of Vestibulo-Ocular Reflex (VOR)).

FIG. 7 is a view showing an outline of the vestibulo-ocular reflex (VOR). When a head is moved in viewing an object 9, the visual field is also moved. At this time, an image on a retina is also moved. However, if an eyeball 3 moves (rotation (turn) of an eye) so as to cancel the movement of the head (rotation (turn) of a face, and rotation of a head) 8, a sight line 2 is stabilized (is not moved), and the retina image is not moved. Such a reflective eyeball movement having a function of stabilizing the retina image, is called a compensatory eye movement. The vestibule-ocular reflex is one of the compensatory eye movements, in which a reflection is generated, with the rotation of the head as a stimulant. A neural mechanism of the vestibule-ocular reflex by horizontal rotation (horizontal turn) is clarified to some extent as follows. Namely, it can be considered that rotation 8 of the head is detected by a horizontal semicircular canal, and input from the horizontal semicircular canal adds inhibitory and excitatory action on extraocular muscles, to thereby move the eyeball 3.

When the head rotates, the eyeball is also rotated by the vestibule-ocular reflex, but the retina image is not moved. Then, the lens 10 provided in spectacle 1 is rotated in conjunction with rotation of the head as shown by broken line and one dot chain line of FIG. 7. Therefore, the sight line 2 passing through the lens 10 by the vestibule-ocular reflex, moves on the lens 10 relatively. Accordingly, if there is a difference of an imaging performance of the lens 10 in a range in which the eyeball 3 moves by the vestibule-ocular reflex, namely in a range through which the sight line 2 passes by the vestibule-ocular reflex, the retina image sometimes swings.

Figure 8:
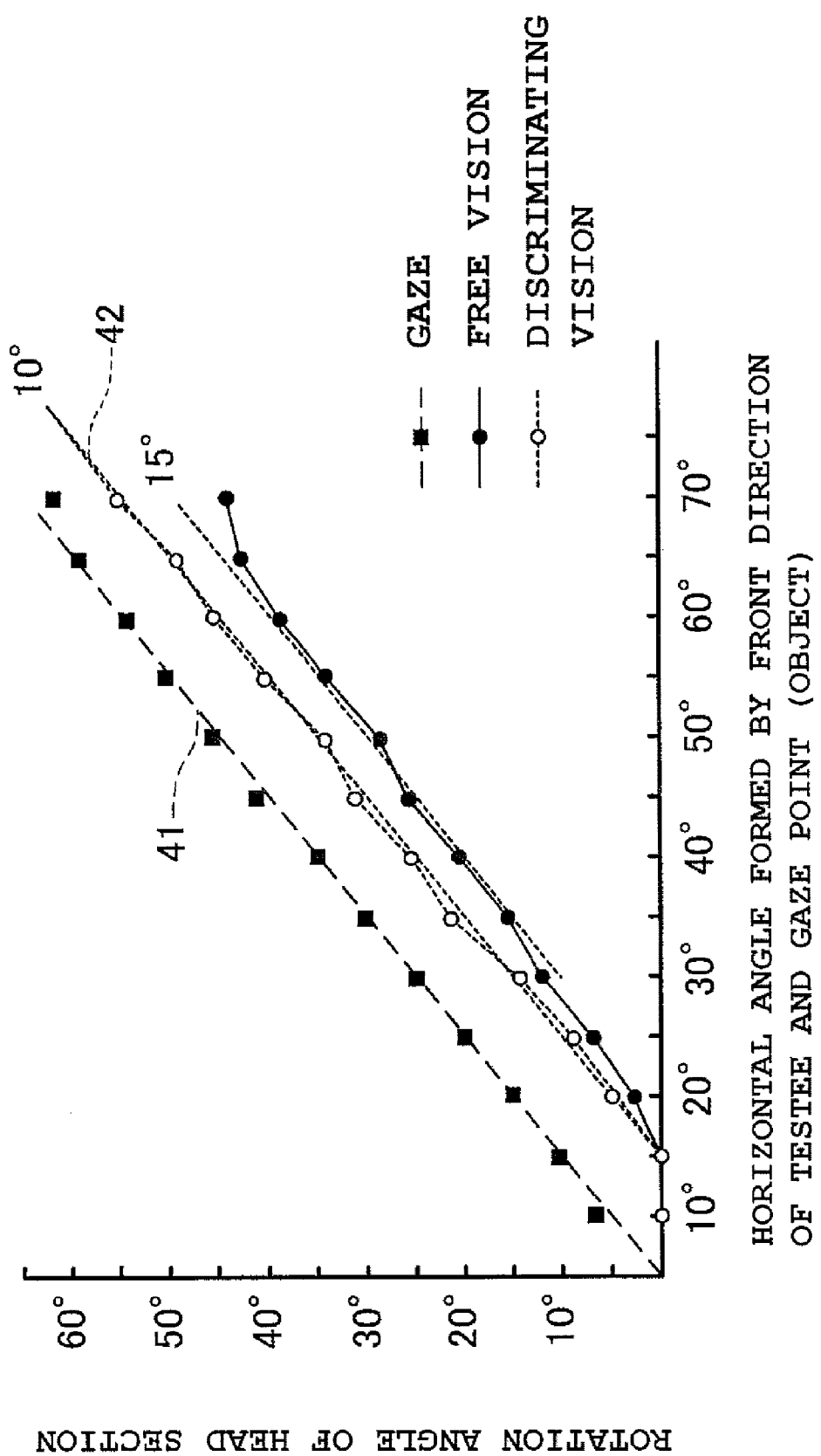
FIG. 8 is a graph showing an example of observing a head position (eye position) movement.

FIG. 8 is a graph showing an example of observing a movement of a head position (primary position) when searching an object. The horizontal axis indicates an angle formed by a front direction of an examinee and a gaze point (object), and the vertical axis indicates a rotation angle of the head. A graph shown in FIG. 8 shows a degree of the rotation of the head, to recognize the object that moves by a certain angle from the gaze point in the horizontal direction. In a fixation state for focusing the object 9, the head is rotated together with the object 9 as shown in graph 41. Meanwhile, in a state of a discriminating view for simply recognizing the object, as shown in graph 42, the movement of the head becomes smaller (reduced) by about 10 degrees than the angle (movement) of the object. Owing to such an observation result, a limit of a range of recognizing the object 9 by the movement of the eyeball can be set to about 10 degrees. Accordingly, it can be considered that a rotation angle of the head in the horizontal direction when viewing the object 9 by the vestibule-ocular reflex while moving a human head in a natural state, is about 10 degrees in maximum in right and left (a maximum horizontal angle θxm formed by the movement of the eyeball 3 by the vestibule-ocular reflex).

Meanwhile, in a case of the progressive addition lens, there is a variation in powers in the intermediate portion 13, and therefore if the rotation of the head is maximum in the vertical direction when viewing the object 9 by the vestibule-ocular reflex, power is not fitted to a distance of the object due to a large movement, thus blurring the image. Therefore, it can be considered that the maximum rotation angle of the head in the vertical direction when viewing the object 9 by the vestibule-ocular reflex, is smaller than the maximum rotation angle in the horizontal direction. As described above, the rotation angle of the head which is a parameter in a case of performing a simulation of the swing, is about 10 degrees in the horizontal direction in right and left, and is smaller than the horizontal maximum rotation angle in the vertical direction, and is about 5 degrees vertically for example, and such a rotation angle of the head is preferably used. Further, a typical value of the range in which the sight line moves by the vestibule-ocular reflex, is about ±10 degrees in the horizontal direction in right and left of the principal sight line 14.

Figure 9:
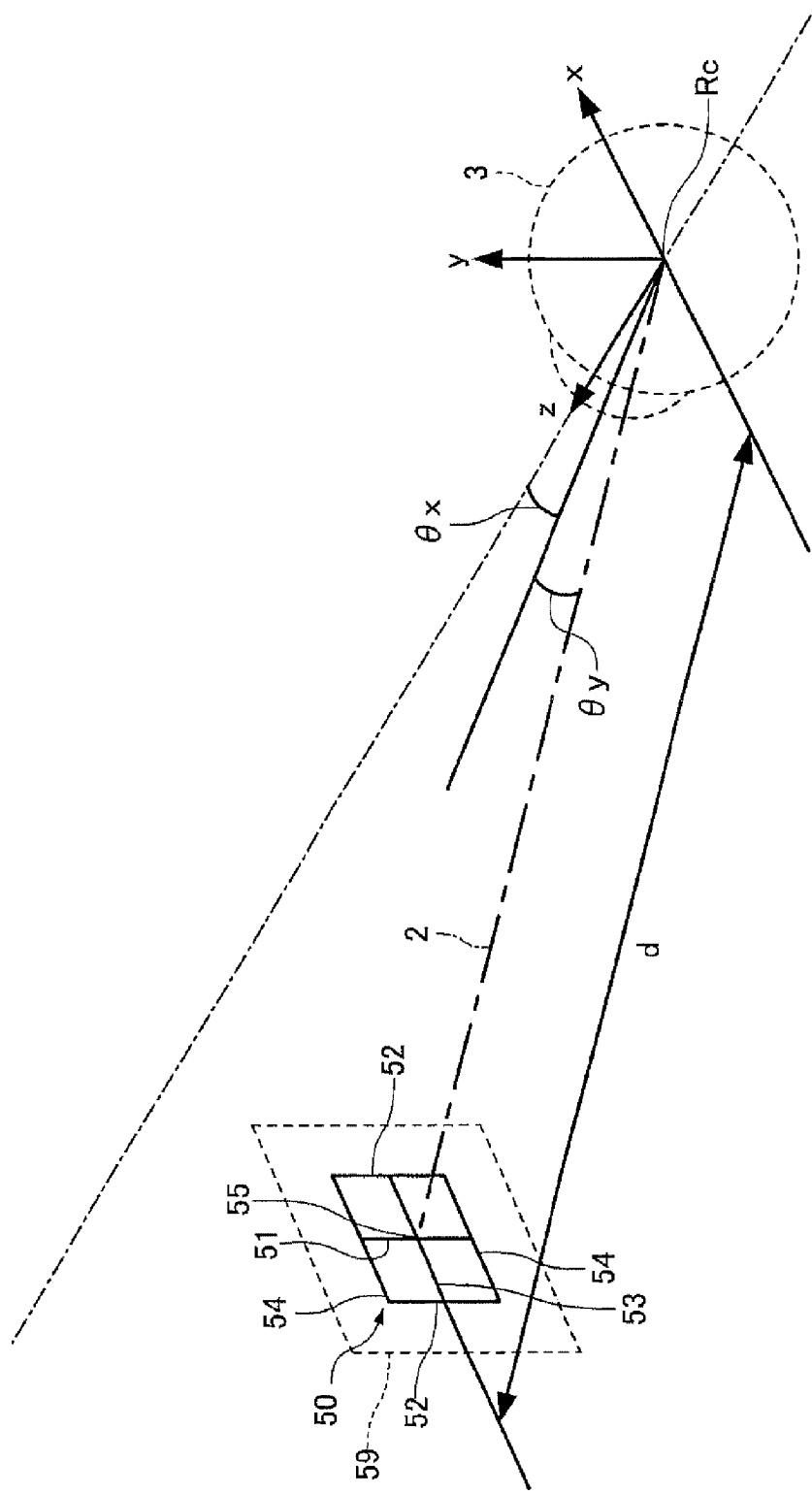
FIG. 9 is a view showing a state of performing a vision simulation in consideration of the vestibule-ocular reflex when a head is rotated with respect to an object 9 disposed on a virtual surface 59 in a virtual space.

FIG. 9 shows a state that simulation is performed for a vision in consideration of the vestibule-ocular reflex when rotating the head to the object 9 disposed on a virtual surface 59 in a virtual space. In an example shown in FIG. 9, the object 9 is a rectangular pattern (sign of the object 9 is not shown in FIG. 6). The z-axis is set in a horizontal front direction, with rotation center Rc of the eyeball 3 as an origin, and the x-axis is set in the horizontal direction and the y-axis is set in the vertical direction in the virtual space. The x-axis, y-axis, and z-axis are orthogonal to each other. The rectangular pattern 50 is formed on the virtual surface 59 across distance d in a direction of angle θx with respect to y-z plane and angle θy with respect to x-z plane.

In an example shown in FIG. 9, the rectangular pattern 50 is vertically bisected square grid, including central vertical grid line 51 passing through geometrical center 55 and right and left vertical grid lines 52 which are bilaterally symmetrical with respect to the central vertical grid line 51, central horizontal grid line 53 passing through the geometrical center 55, and upper and lower horizontal grid lines 54 which are vertically symmetrical with respect to the central horizontal grid line 53. In the rectangular pattern 50 of the square grid, distance d between the virtual surface 59 and the eyeball 3 is adjusted so that a pitch (interval of the adjacent vertical grid lines 51 (horizontal grid lines 53)) is set on the lens 10 at a viewing angle. Note that the pitch is expressed by an angle (unit°) in the horizontal direction or in the vertical direction, with a straight line connecting the rotation center Rc and the geometrical center 55 as a reference.

In the example shown in FIG. 9, the lens 10 is disposed in front of the eyeball 3 at the same position and in the same posture as an actual as-worn position and posture of the lens 10, and the virtual surface 59 is set so as to view the vicinity of the maximum horizontal angle θxm in which the eyeball 3 moves to the gaze point by the vestibule-ocular reflex, namely, so as to view the right and left vertical grid lines 52 and the upper and lower horizontal grid lines 54 at ±10 degrees with respect to the gaze point.

The size of the rectangular pattern 50 of the square grid can be defined by the viewing angle, and can be set in accordance with a viewed object. For example, the pitch of the grid is small on a screen of a mobile computer, and the pitch of the grid is large on the screen of a desktop computer.

Meanwhile, it is appropriate to set the distance d to the virtual surface 59, as a long distance of several meter or more in the distance portion 11, as a near distance of about 40 cm to 30 cm in the near portion 12, and as an intermediate distance of about 1 m to 50 cm in the intermediate portion 13, because there is a variation in the distance of the object 9 estimated by the distance portion 11, the intermediate portion 13, and the near portion 12. However, there is no necessity for strictly setting the distance d in accordance with distance, intermediate, and near areas on the lens, because the rectangular pattern 50 in a distance of 2 m to 3 m is supposed to be observed in the intermediate portion 13 and the near portion 12, when walking.

The rectangular pattern 50 is observed by refraction of the lens 10, in a direction of the viewing angle deviated from a viewing direction (θx, θy). An observation image of the rectangular pattern 50 at this time, can be obtained by a normal ray tracing method. If the head is rotated by +α° in the horizontal direction with this state as a reference, the lens 10 is also rotated by +α° together with a face. At this time, the eyeball is reversely rotated by α°, namely −α° by the vestibule-ocular reflex, and therefore the sight line 2 views the geometrical center 55 of the rectangular pattern 50 on the lens 10 using a position moved by −α°. Accordingly, a transmission point of the sight line 2 through the lens 10 and an incident angle on the lens 10 are varied, and therefore the rectangular pattern 50 is observed in a form different from an actual form. Such a deviation in the form is a factor of causing the swing of the image.

Therefore, in the evaluation method of the swing described in this section, an image of the rectangular pattern 50 is obtained at both end positions of maximum or specific rotation angle θx1 at the time of repeated right and left, or upper and lower rotation of the head, and the obtained image is overlapped on the geometrical center 55, to thereby geometrically calculate the deviation of the form of both images. Maximum horizontal angle (about 10 degrees) in which the eyeball 3 moves by the vestibule-ocular reflex, is given as an example of the horizontal angle θx1.

In the evaluation method of the swing described in this item, swing index IDs is given as the index used for evaluating the swing. Swing index IDs is the index indicating a moving area of the vertical grid line 51, vertical grid line 52, horizontal grid line 53 and horizontal grid line 54.

Figure 10:
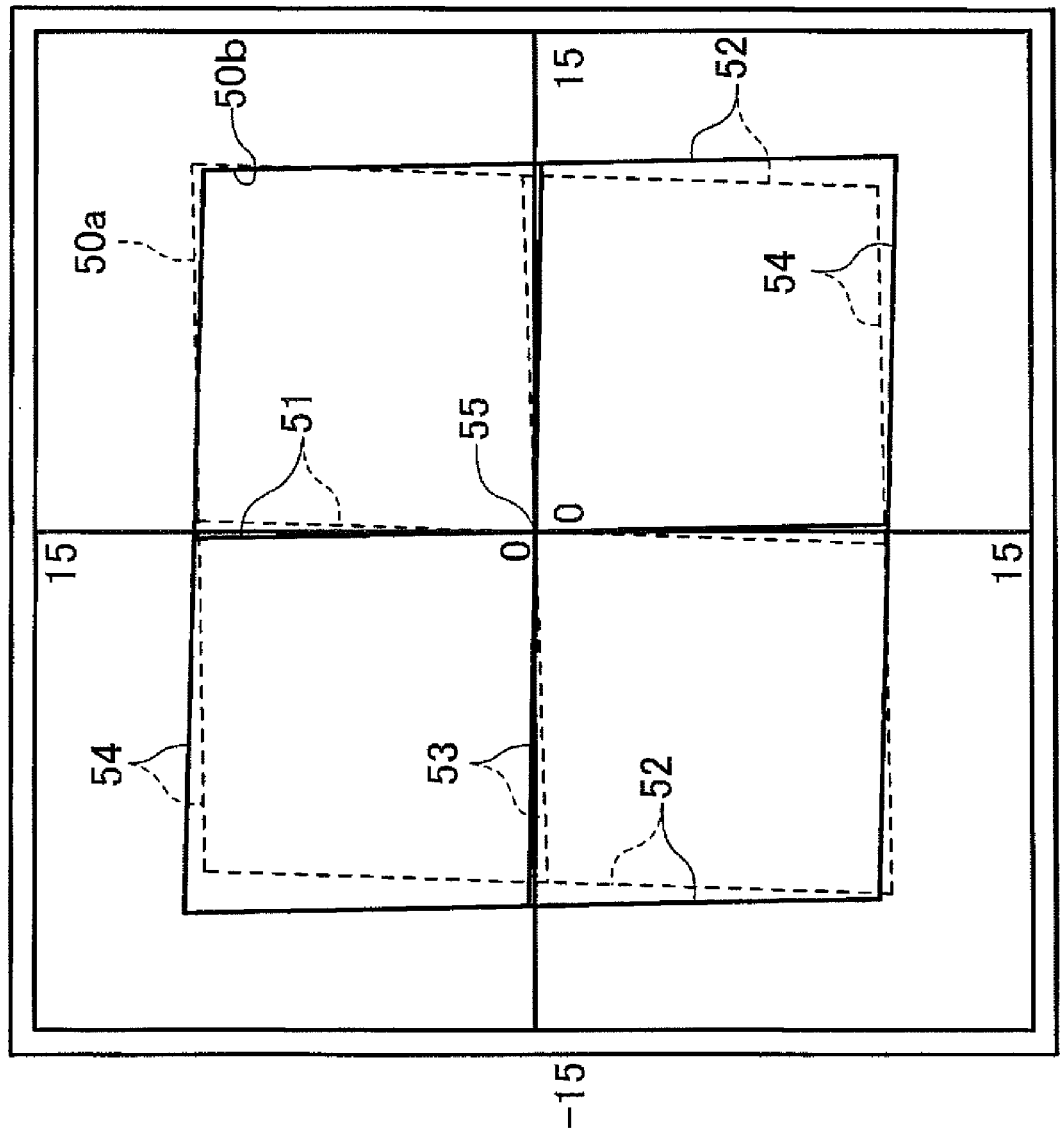
FIG. 10 is a view showing an example of an image of a rectangular pattern 50 when an eyeball 3 and the rectangular pattern 50 are moved in right and left at a first horizontal angle of θ×1 with respect to a gaze point.

FIG. 10 shows an example of the image of the rectangular pattern 50 when moving the eyeball 3 and the rectangular pattern 50 in right and left at first horizontal angle (shaking angle) θ×1 (10 degrees) with respect to the gaze point. A state shown in FIG. 10 corresponds to a state of viewing the rectangular pattern so that the sight line 2 does not move from the geometrical center 55 of the rectangular pattern 50, when the head moves in right and left in an as-worn state of the lens 10 at 10 degrees of the horizontal angle (shaking angle) θ×1. The rectangular pattern 50a (broken line) is an image (right rotation image) observed at shaking angle of 10° through the lens 10 by the ray tracing method, and the rectangular pattern 50b (solid line) is an image (left rotation image) similarly observed at shaking angle of −10°. In FIG. 10, the rectangular patterns 50a and 50b are shown in a state of being overlapped on each other so that the geometrical centers 55 coincide with each other. Note that the image of the rectangular pattern 50 observed at shaking angle of 0° is positioned almost in a middle of them (not shown). An image observed when setting the shaking angle vertically (upper rotation image and lower rotation image) can also be similarly obtained.

The rectangular patterns 50a and 50b correspond to the image of the rectangular pattern 50 which is actually recognized by a user when shaking a head while viewing the rectangular pattern 50 through the lens 10. A difference between the rectangular patterns 50a and 50b corresponds to the movement of the image actually recognized by the user when shaking the head.

Figure 11:
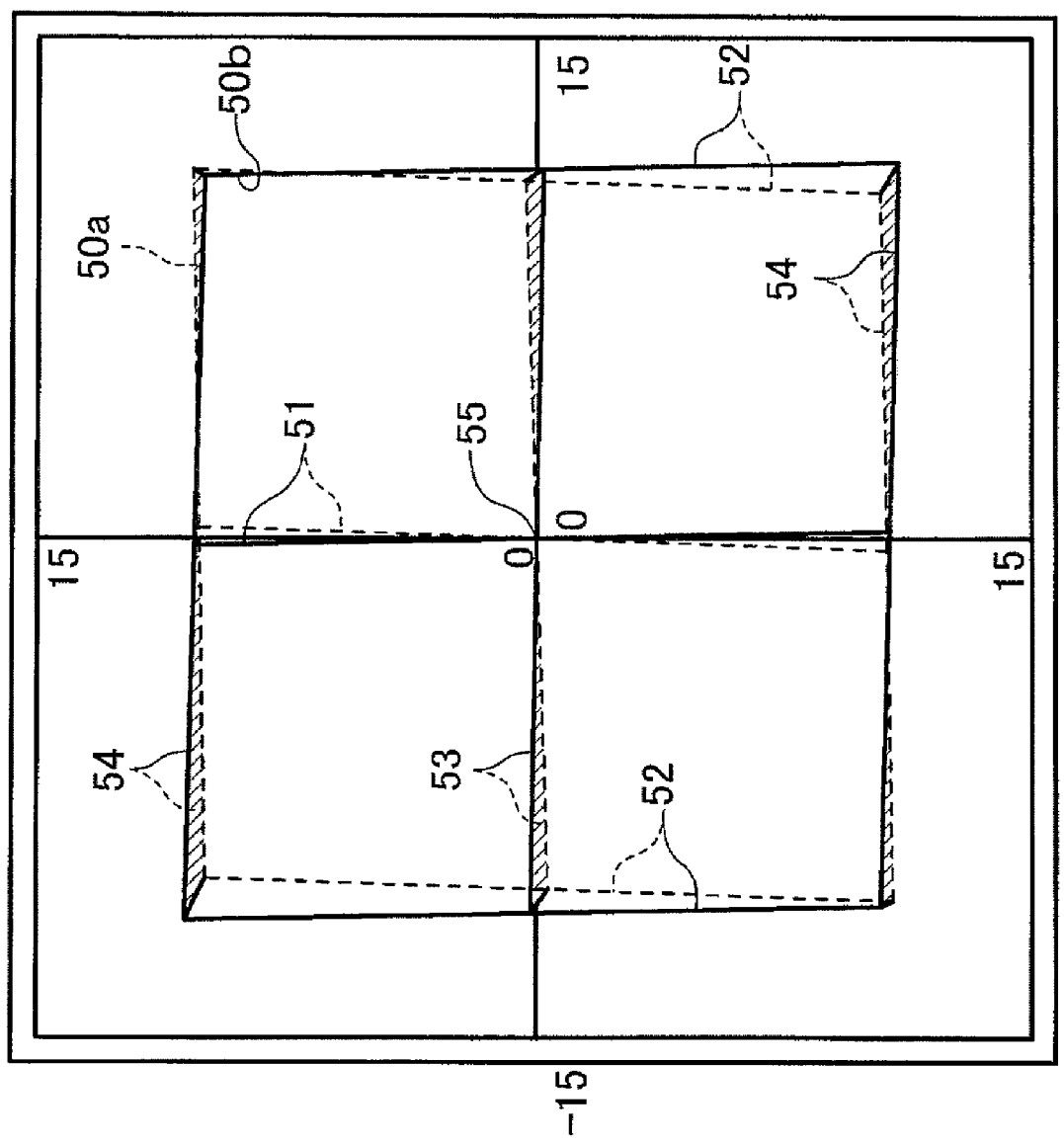
FIG. 11 is a view for describing a swing index IDs.
Figure 12:
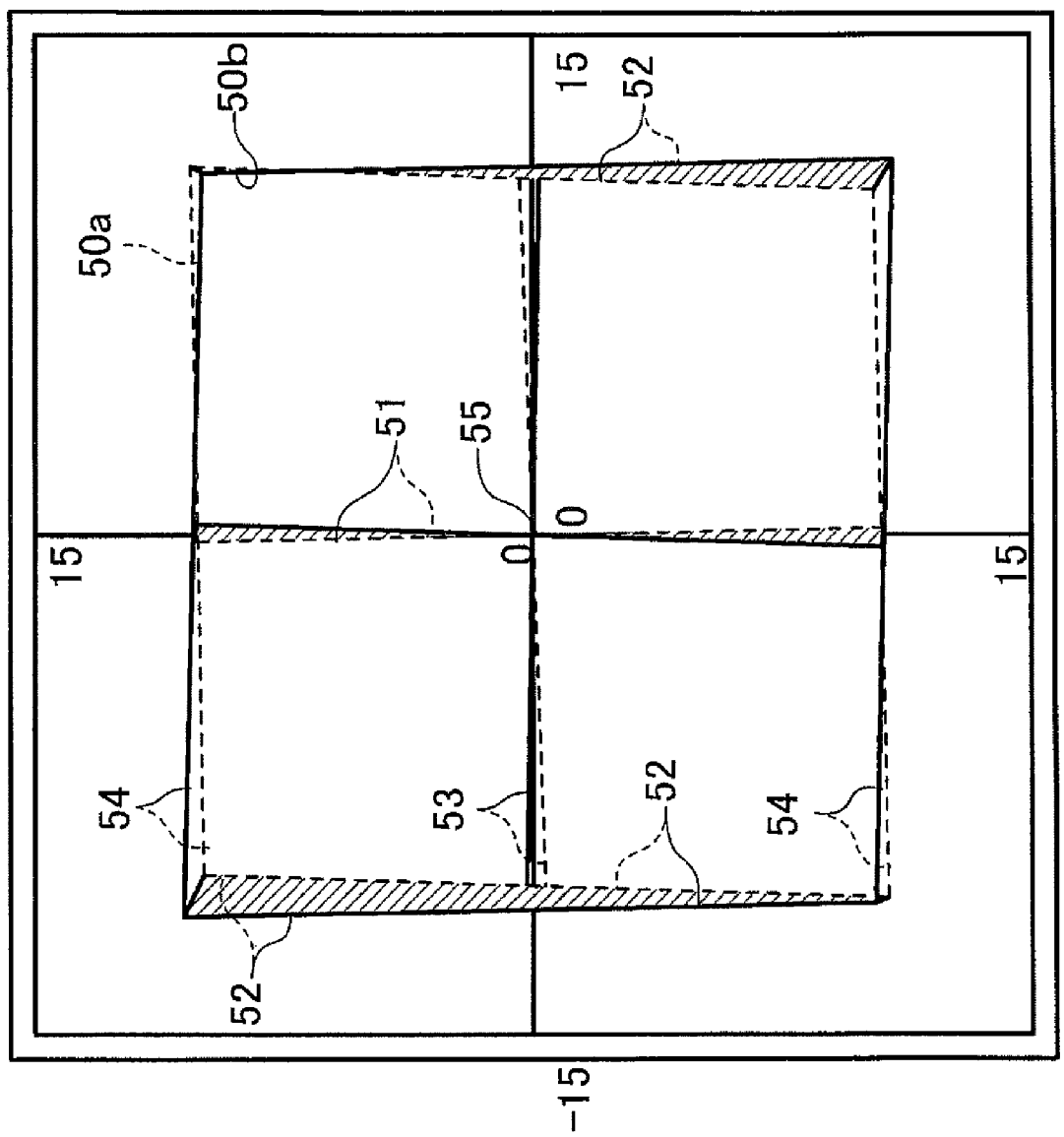
FIG. 12 is a view for describing the swing index IDs.

FIG. 11 and FIG. 12 are views for describing the swing index IDs. Swing index IDs is the index indicating the moving area of the vertical grid line 51, vertical grid line 52, horizontal grid line 53 and horizontal grid line 54. Namely, swing index IDs is the index corresponding to the magnitude of the deformation of the entire shape of the rectangular pattern 50. As shown in FIG. 11 and FIG. 12, twelve numerical values can be obtained as the swing index IDs by geometrically calculating each moving amount of the vertical grid line 51, vertical grid line 52, horizontal grid line 53 and horizontal grid line 54 of the rectangular pattern 50 as an area. FIG. 11 shows the moving amount (shaded part) of the horizontal grid lines 53 and 54, and FIG. 12 is a view showing the moving amount of the vertical grid lines 51 and 52 (shaded part). It can be considered that "flickering" is expressed by the moving amount of the vertical grid line 51 and the vertical grid line 52 out of these gird lines, and "swell (waving)" is expressed by the moving amount of the horizontal grid lien 53 and the horizontal gird line 54. Accordingly, if the moving amounts of the vertical grid line 51 and the vertical grid line 52 are added-up, the swing can be quantitatively evaluated as the "sense of flickering". Further, if the moving amounts of the horizontal grid line 53 and the horizontal grid line 54 are added-up, the swing can be quantitatively evaluated as a "sense of swell (waving)". Also, when the lens 10 has a large variation of magnification at a point near an evaluation point, for example when deformation such as expansion and contraction occurs in the horizontal direction, the swing index IDs is the index including such an element.

The unit of the swing index IDs is the square of degree (°) because the swing index IDs indicates the area on the viewing angle coordinate. Note that a value obtained by dividing the moving area of the vertical grid line 51, the vertical grid line 52, the horizontal grid line 53, and the horizontal grid line 54, by the area of the rectangular pattern 50 before the head is caused to rotate (0 degree) and expressed by ratio (for example percentage), can also be used as the swing index IDs.

Regarding the swing index IDs, sum of moving areas of the vertical grid line 51 and vertical grid line 52 is defined as "vertical L", and sum of the moving areas of horizontal grid line 53 and horizontal grid line 54 is defined as "horizontal L", and sum of the "vertical L" and "horizontal L" may be indicated by an index s "total L".

"Horizontal L" and "vertical L" can be said as the indexes close to the sense of a user, from a fact that movement of an outline of the object grasped as a form is simultaneously sensed when a human such as a "user" actually feels the swing. Further, the user feels horizontal and vertical swings simultaneously, and therefore total swings of them, namely, "total L" can be a most appropriate index. However, there is a possibility that sensitivity to the "sense of flickering" and "sense of swell (waving)" is different depending on the user, or regarding a use of the sight line in the individual living environment, the following cases can be considered. Namely, movement of the sight line occurs frequently in the horizontal direction, and therefore what matters here is the "swell (waving)" or reversely the "flickering". Accordingly, it is also useful to index and evaluate the swing by each direction component. The merit of the swing index IDs is a point that the variation of magnification is taken into consideration. Particularly, in the case of the progressive addition lens, power is added in the vertical direction. Therefore, when viewing an object by vertically shaking a neck, following phenomena are generated. Namely, the image is expanded or contracted, or viewed swinging back and forth, depending on the variation of powers. Further, even when the addition power is large, there is a remarkable phenomenon that the magnification is reduced in the side part of the near portion 12. Therefore, expansion/contraction of the image occurs in the lateral direction of the image. Since these variations can be indicated by values, the swing index IDs is useful as the evaluation method.

4. EXAMPLE

FIG. 13 is a table showing parameters in examples and comparative examples described hereafter. The unit of the values in FIG. 13 is dioptre (D). Values of power Sph[D], example number (No.), vertical base curve (BC(vertical)) [D], horizontal base curve (BC(horizontal))[D], toric surface element [D], and degressive element (degression)[D], are respectively shown sequentially from the left. Note that the vertical base curve corresponds to surface power OVPf. Horizontal base curve corresponds to surface power OHPf.

The progressive addition lens of examples and comparative examples shown below, is designed so that a corridor length of 14 mm as a spectacle specification applied to the progressive addition lens produced by SEIKO OPTICAL PRODUCTS CORPORATION, LTD. "SEIKO P-1SYN-ERGY 1.67AS(power: 1.67)". The lens (finished lens not subjected to edging) has a diameter of 65 mm, and does not include an astigmatic power. The progressive addition lens of examples and comparative examples are fabricated by varying the degressive element in each combination of power Sph and addition power Add.

4.1 Structures of Example 1-1 to Example 1-3 and Comparative Example 1

Example 1-1 to example 1-3 and comparative example 1 are the examples and comparative examples in the case that power Sph is 4.00 (D), and addition power Add is 2.00 (D). The surface power of the object-side surface 19A is called an outer surface power, and the surface power of the eyeball-side surface 19B is called an inner surface power hereafter. The inner surface power is originally a negative value, but shows an absolute value in this embodiment.

Figure 14A:
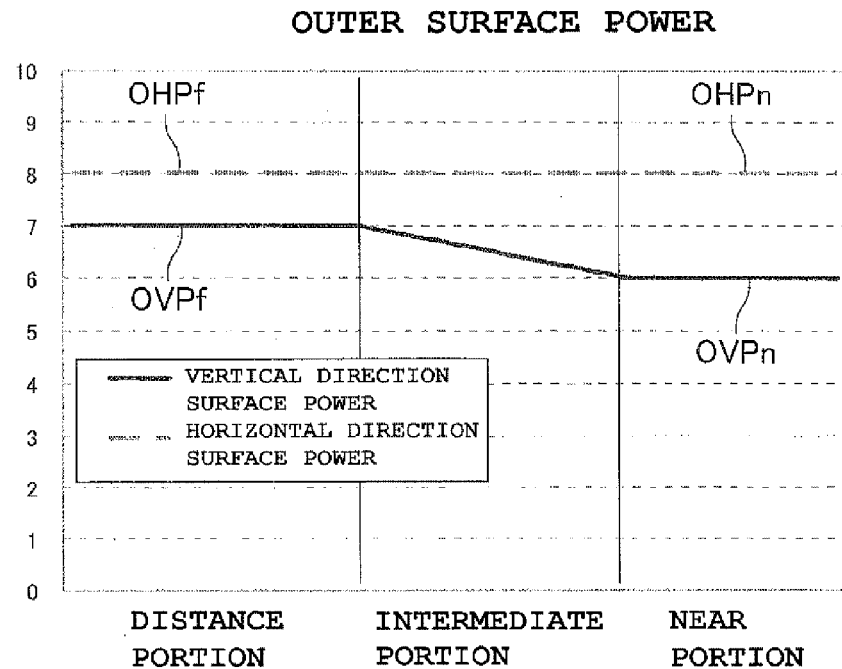
FIG. 14(A) is a graph showing an outer surface power in a vertical direction and in a horizontal direction on a principal sight line of example 1-1.
Figure 14B:
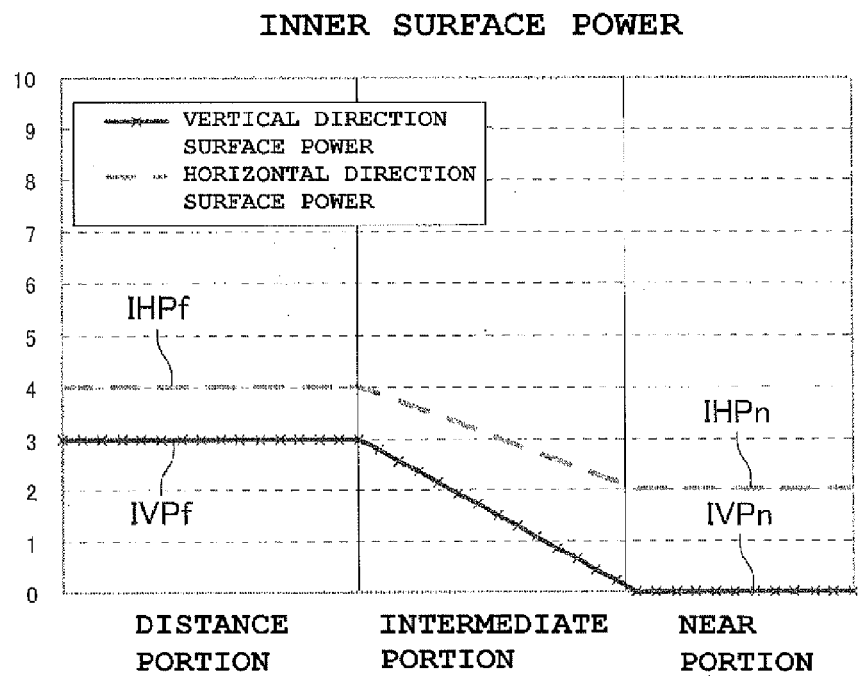
FIG. 14(B) is a graph showing an inner surface power in a vertical direction and in a horizontal direction on a principal sight line of example 1-1.
Figure 15A:
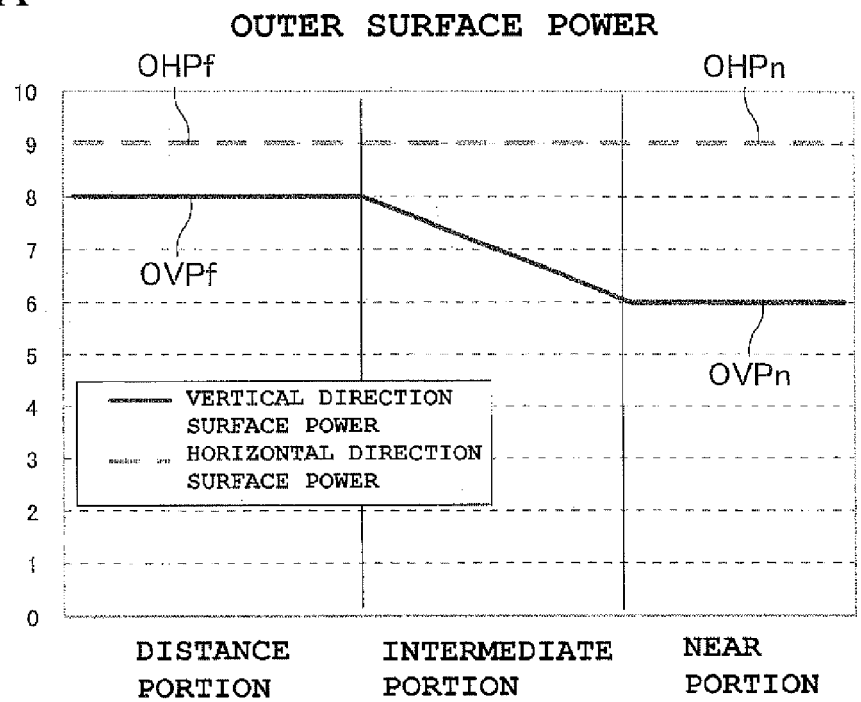
FIG. 15(A) is a graph showing an outer surface power in a vertical direction and in a horizontal direction on a principal sight line of example 1-2.
Figure 15B:
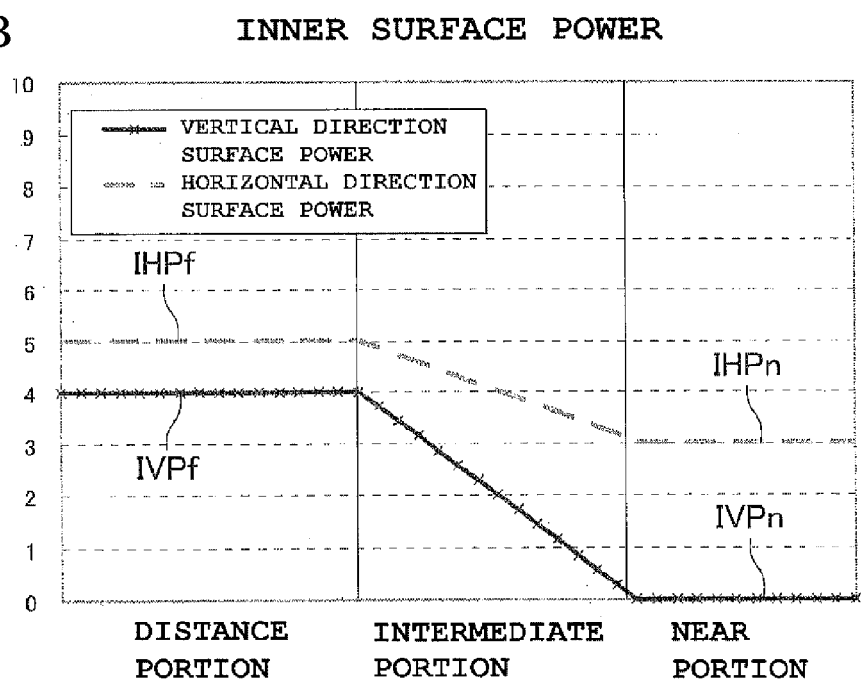
FIG. 15(B) is a graph showing an inner surface power in a vertical direction and in a horizontal direction on a principal sight line of example 1-2.
Figure 16A:
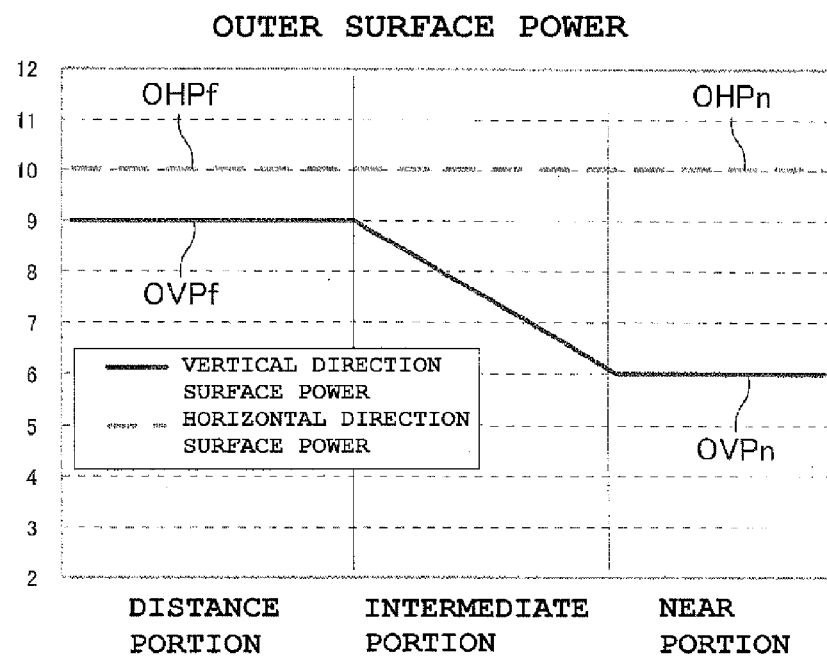
FIG. 16(A) is a graph showing an outer surface power in a vertical direction and in a horizontal direction on a principal sight line of example 1-3.
Figure 16B:
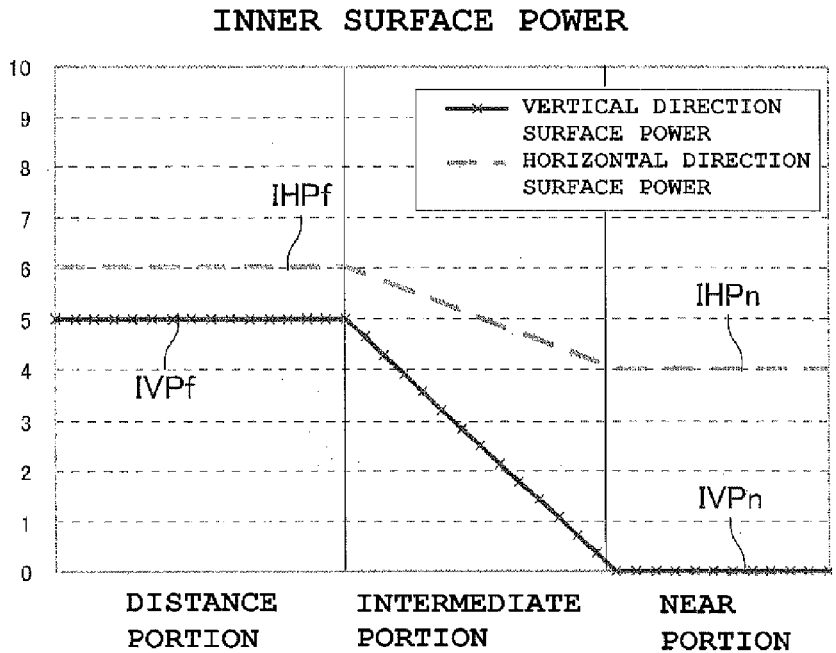
FIG. 16(B) is a graph showing an inner surface power in a vertical direction and in a horizontal direction on a principal sight line of example 1-3.
Figure 17A:
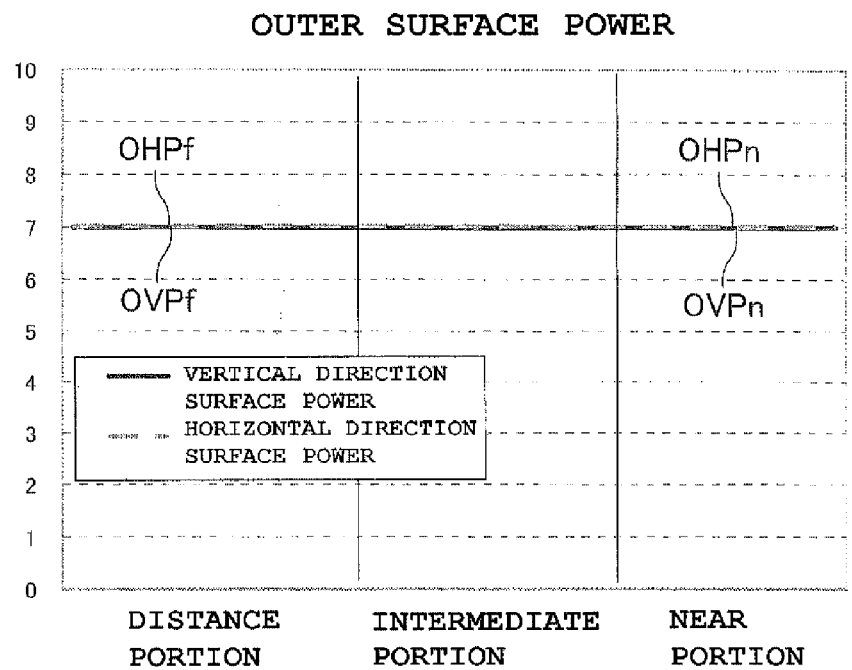
FIG. 17(A) is a graph showing an outer surface power in a vertical direction and in a horizontal direction on a principal sight line of comparative example 1.
Figure 17B:
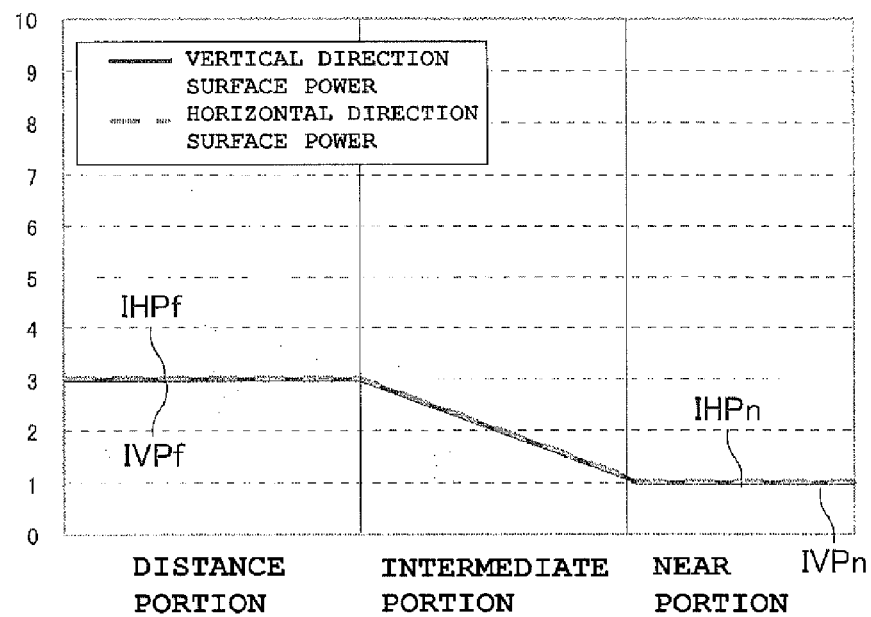
FIG. 17(B) is a graph showing an inner surface power in a vertical direction and in a horizontal direction on a principal sight line of comparative example 1.

FIG. 14(A) is a graph showing vertical and horizontal outer surface powers on the principal sight line of example 1-1, and FIG. 14(B) is a graph showing vertical and horizontal inner surface powers on the principal sight line of example 1-1. FIG. 15(A) is a graph showing vertical and horizontal outer surface powers on the principal sight line of example 1-2, and FIG. 15(B) is a graph showing vertical and horizontal inner surface powers on the principal sight line of example 1-2. FIG. 16(A) is a graph showing vertical and horizontal outer surface powers on the principal sight line of example 1-3, and FIG. 16(B) is a graph showing vertical and horizontal inner surface powers on the principal sight line of example 1-3. FIG. 17(A) is a graph showing vertical and horizontal outer surface powers on the principal sight line of comparative example 1, and FIG. 17(B) is a graph showing vertical and horizontal inner surface powers on the principal sight line of comparative example 1. In each case, the horizontal axis corresponds to the coordinate on the principal sight line.

The progressive addition lens of example 1-1 to example 1-3 includes the abovementioned conditions (1) to (4). Namely, horizontal surface power OHPf is larger than vertical surface power OVPf in the distance portion 11 of the area along the principal sight line 14 on the object-side surface 19A (condition (1)). Also, horizontal surface power OHPn is larger than vertical surface power OVPn in the near portion 12 of the area along the principal sight line 14 on the object-side surface 19A (condition (2)). Also, vertical surface power OVPf in the distance portion 11 is larger than vertical surface power OVPn in the near portion 12, in a degressive state (condition (3)). Also, in the progressive addition lens of example 1-1 to example 1-3, horizontal surface power OHPm is also larger than vertical surface power OVPm in the intermediate portion 13 of the area along the principal sight line 14 on the object-side surface 19A.

Further, the object-side surface 19B includes the element for canceling the toric surface element included in the object-side surface 19A under condition (1) and condition (2). Namely, horizontal surface power IHPf is larger than vertical surface power IVPf in the distance portion 11 of the area along the principal sight line 14 on the object-side surface 19B. Also, horizontal surface power IHPn is larger than vertical surface power IVPn in the near portion 12 of the area long the principal sight line 14 on the eyeball-side surface 19B.

Further, the difference between vertical surface power IVPf in the distance portion 11 and vertical surface power IVPn in the near portion 12 of the area along the principal sight line 14 on the eyeball-side surface 19B, is larger than the difference between vertical surface power OVPf in the distance portion 11 and vertical surface power OVPn in the near portion 12 of the area along the principal sight line 14 on the object-side surface 19A, so that addition can be realized on the eyeball-side surface 19B with respect to the degression on the object-side surface 19A (Condition (4)).

Meanwhile, the progressive addition lens of comparative example 1 is a conventional inner surface progressive lens not including the abovementioned conditions (1) to (4).

Note that the variation of the surface power shown in FIG. 14 to FIG. 17 is briefly shown simply for understanding a basic structure. In an actual design, aspheric correction is added thereto, aiming at correcting an aberration in a lens circumferential view. A power variation is slightly generated in the vertical direction and the horizontal direction in the upper part of the distance portion 11 and the near portion 12.

4.2. Comparison Between Example 1-1 to Example 1-3, and Comparative Example 1

Figure 18A:
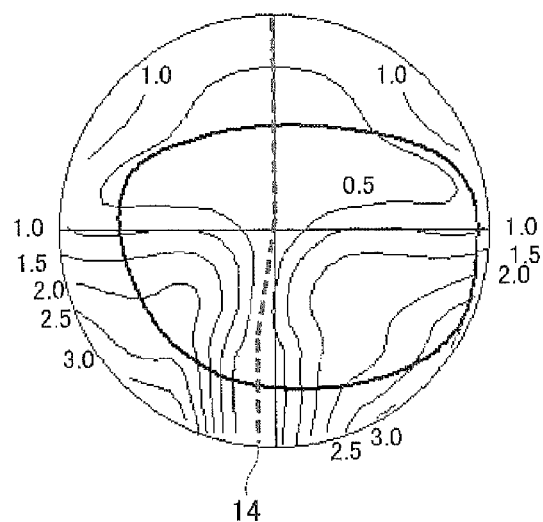
FIG. 18(A) is a view showing an astigmatism distribution when observing it through each position on a lens of the progressive addition lens of example 1-1.
Figure 18B:
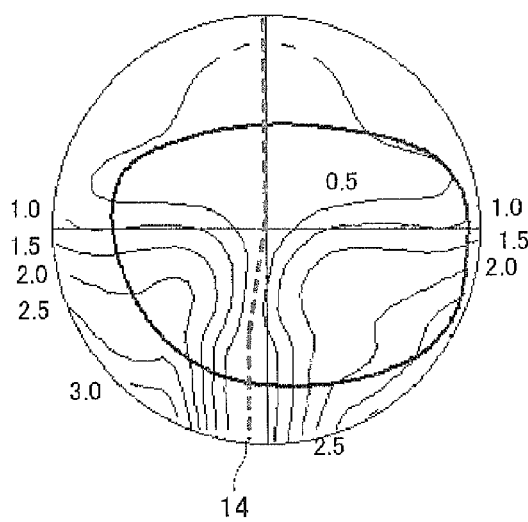
FIG. 18(B) is a view showing an astigmatism distribution when observing it through each position on a lens of the progressive addition lens of example 1-2.
Figure 18C:
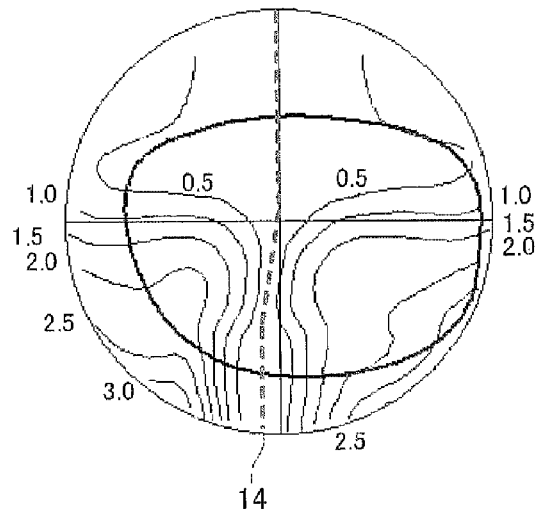
FIG. 18(C) is a view showing an astigmatism distribution when observing it through each position on a lens of the progressive addition lens of example 1-3.
Figure 18D:
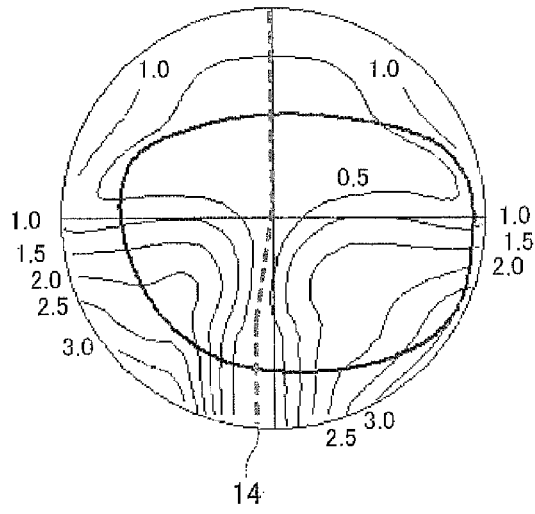
FIG. 18(D) is a view showing an astigmatism distribution when observing it through each position on a lens of the progressive addition lens of comparative example 1.

FIG. 18(A) is a view showing an astigmatism distribution when observing it through each position on the lens of the progressive addition lens of example 1-1 (through outer surface and inner surface of the lens, the same applies hereafter), FIG. 18(B) is a view showing an astigmatism distribution when observing it through each position on a lens of the progressive addition lens of example 1-2, FIG. 18(C) is a view showing an astigmatism distribution when observing it through each position on a lens of the progressive addition lens of example 1-3, and FIG. 18(D) is a view showing an astigmatism distribution when observing it through each position on a lens of the progressive addition lens of comparative example 1. As shown in FIG. 18(A) to FIG. 18(D), the astigmatism distributions of the progressive addition lenses of example 1-1 to example 1-3 are approximately the same as the astigmatism distribution of the progressive addition lens of comparative example 1.

Vertical and horizontal straight lines shown in FIG. 18(A) to FIG. 18(D) show a vertical reference line and a horizontal reference line passing through a geometrical center of a circular lens, and a shape image is also shown at the time of mounting the lens in a spectacle frame with the geometrical center as a fitting point Pe, which is an intersection point of the reference lines. The same thing can be said for FIG. 19(A) to FIG. 19(D), FIG. 23(A) to FIG. 23(B), FIG. 24(A) to FIG. 24(B), FIG. 28(A) to FIG. 28(B), and FIG. 29(A) to FIG. 29(B).

Figure 19A:
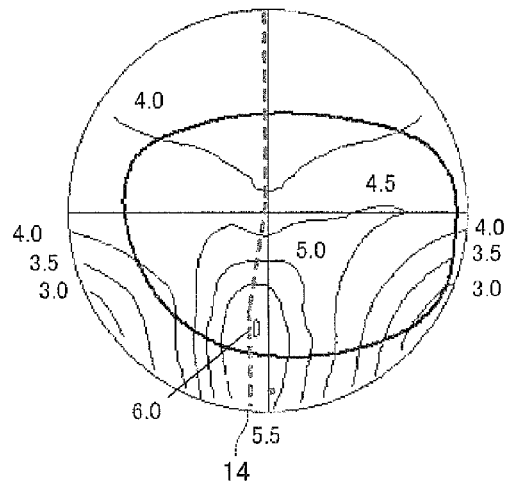
FIG. 19(A) is a view showing an equivalent spherical power distribution when observing it through each position on a lens of the progressive addition lens of example 1-1.
Figure 19B:
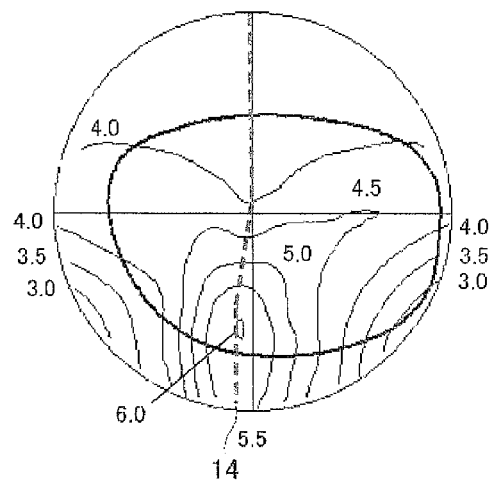
FIG. 19(B) is a view showing an equivalent spherical power distribution when observing it through each position on a lens of the progressive addition lens of example 1-2.
Figure 19C:
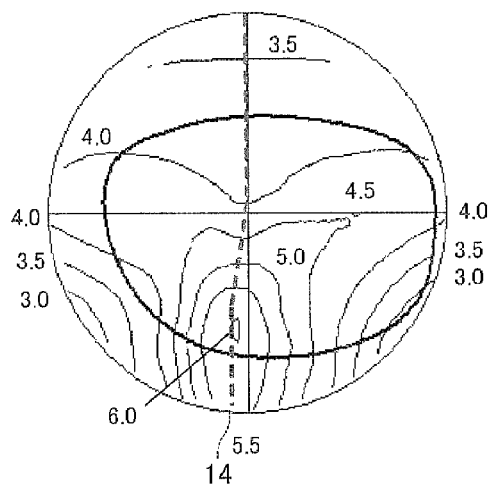
FIG. 19(C) is a view showing an equivalent spherical power distribution when observing it through each position on a lens of the progressive addition lens of example 1-3.
Figure 19D:
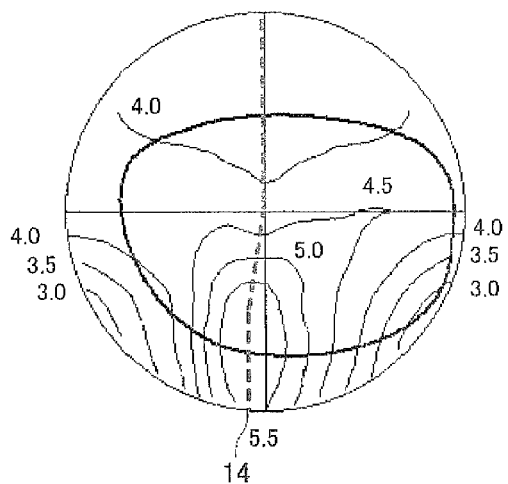
FIG. 19(D) is a view showing an equivalent spherical power distribution when observing it through each position on a lens of the progressive addition lens of comparative example 1.

FIG. 19(A) is a view showing an equivalent spherical power distribution when observing it through each position on a lens of the progressive addition lens of example 1-1, FIG. 19(B) is a view showing an equivalent spherical power distribution when observing it through each position on a lens of the progressive addition lens of example 1-2, FIG. 19(C) is a view showing an equivalent spherical power distribution when observing it through each position on a lens of the progressive addition lens of example 1-3, and FIG. 19(D) is a view showing an equivalent spherical power distribution when observing it through each position on a lens of the progressive addition lens of comparative example 1. As shown in FIG. 19(A) to FIG. 19(D), the equivalent spherical power distributions of the progressive addition lenses of example 1-1 to example 1-3, are approximately the same as the equivalent spherical power distribution of the progressive addition lens of comparative example 1.

Accordingly, it is found that the progressive addition lens of example 1-1 to example 1-3 is the progressive addition lens having almost the same performance as the performance of the progressive addition lens of comparative example 1 in the astigmatism distribution and the equivalent spherical power distribution, by effectively using the aspheric correction.

FIG. 20 is a graph showing the swing index IDs of example 1-1 to example 1-3 and comparative example 1. The horizontal axis indicates a vertical viewing angle corresponding to the coordinate on the principal sight line, and the vertical axis indicates the value corresponding to "total L" in the swing indexes IDs. The pitch of the rectangular pattern 50 is 10 degrees, and the swing of the head is 10 degrees horizontally in right and left respectively.

In each lens, the fitting point Pe is a primary position, namely, an intersection point of the sight line of a wearer and an outer surface of the lens in a horizontal front view in which the vertical viewing angle and the horizontal viewing angle are 0 degree. The distance portion 11 is a range from the fitting point Pe to 20 degrees upward, the intermediate portion 13 is a range from the fitting point Pe to the vicinity of −28 degrees downward, and the near portion 12 is a range below the intermediate portion 13.

As shown in FIG. 20, in any one of the example 1-1 to example 1-3, swing index IDs becomes smaller over the range from the distance portion 11 to the near portion 12, compared with comparative example 1. Accordingly, the progressive addition lenses of example 1-1 to example 1-3 are the lenses with less swing of image viewed through the lens, compared with the progressive addition lens of comparative example 1.

4.3. Structures of Example 2-1 to Example 2-3 and Comparative Example 2

Example 2-1 to example 2-3 and comparative example 2 are the examples and comparative example when power Sph is 4.00 (D) and addition power Add is 1.00 (D). Example 2-2 is shown in the figure hereafter, representing example 2-1 to example 2-3.

Figure 21A:
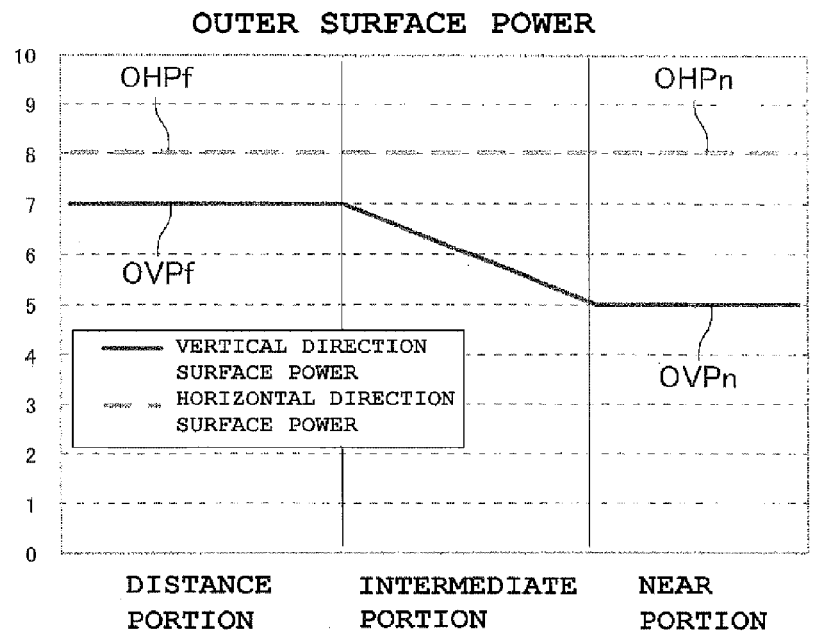
FIG. 21(A) is a graph showing an outer surface power in a vertical direction and in a horizontal direction on a principal sight line of example 2-2.
Figure 21B:
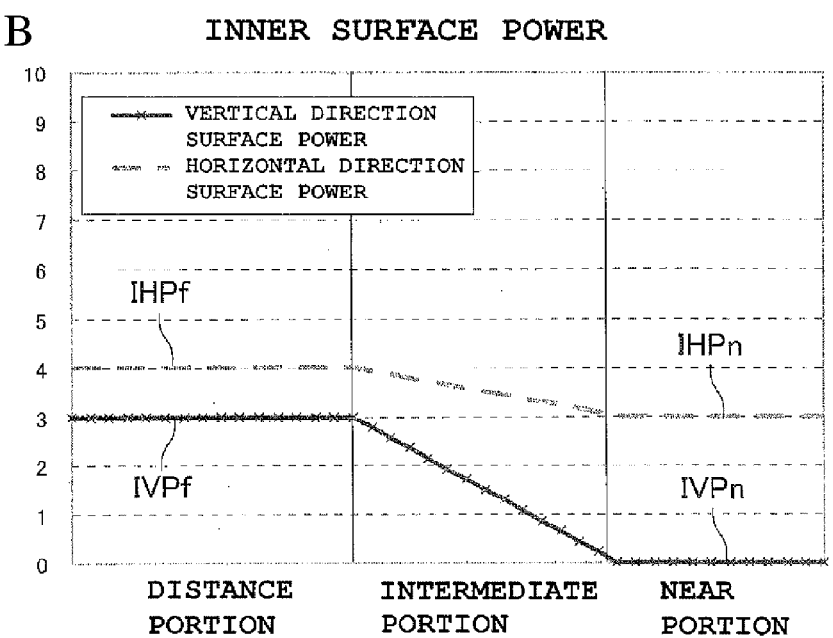
FIG. 21(B) is a graph showing an inner surface power in a vertical direction and in a horizontal direction on a principal sight line of example 2-2.
Figure 22A:
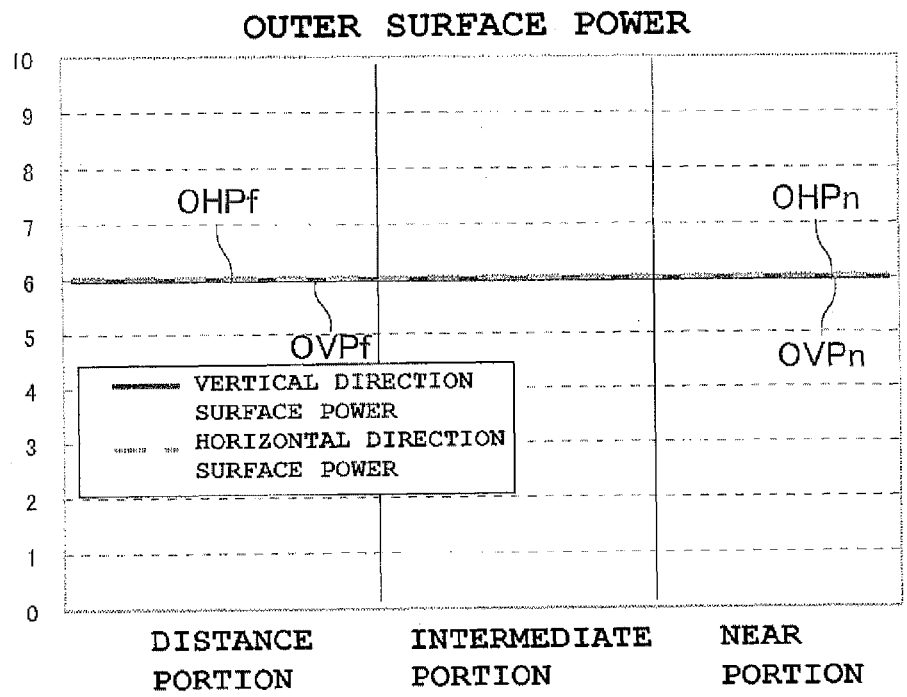
FIG. 22(A) is a graph showing an outer surface power in a vertical direction and in a horizontal direction on a principal sight line of comparative example 2.
Figure 22B:
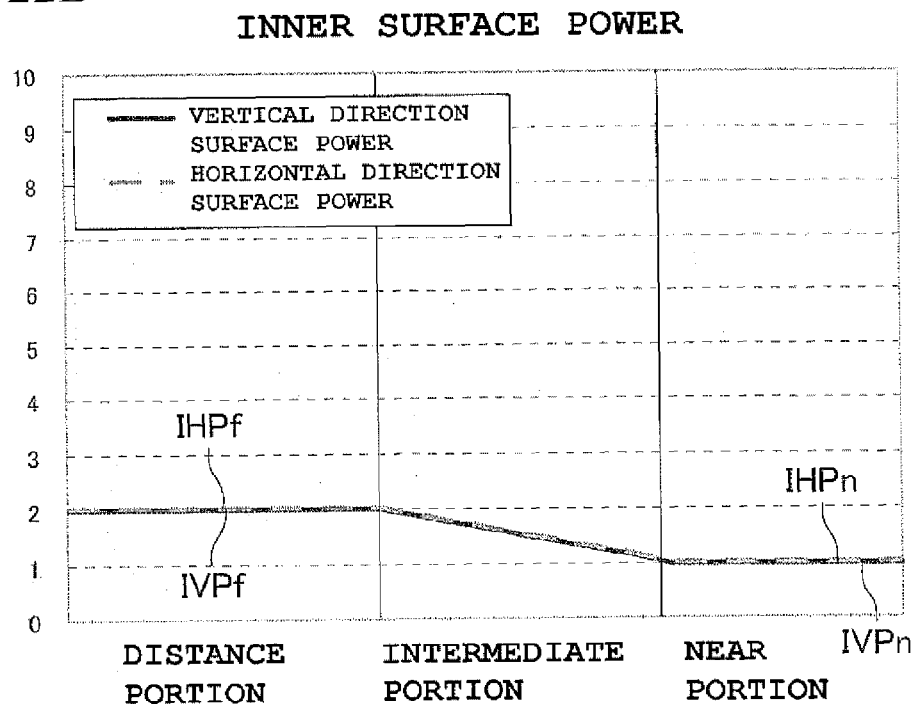
FIG. 22(B) is a graph showing an inner surface power in a vertical direction and in a horizontal direction on a principal sight line of comparative example 2.

FIG. 21(A) is a graph showing vertical and horizontal outer surface powers on the principal sight line of example 2-2, and FIG. 21(B) is a graph showing vertical and horizontal inner surface powers on the principal sight line of example 2-2. FIG. 22(A) is a graph showing vertical and horizontal outer surface powers on the principal sight line of comparative example 2, and FIG. 22(B) is a graph showing vertical and horizontal inner surface powers on the principal sight line of comparative example 2. In each case, the horizontal axis corresponds to the coordinate on the principal sight line.

The progressive addition lens of example 2-1 to example 2-3 includes the abovementioned conditions (1) to (4). Namely, horizontal surface power OHPf is larger than vertical surface power OVPf (condition (1)) in the distance portion 11 of the area along the principal sight line 14 on the object-side surface 19A. Also, horizontal surface power OHPn is larger than vertical surface power OVPn in the near portion 12 of the area along the principal sight line 14 on the object-side surface 19A (condition (2)). Also, vertical surface power OVPf in the distance portion 11 is larger than vertical surface power OVPn in the near portion 12, in a degressive state (condition (3)). Also, in the progressive addition lens of example 2-1 to example 2-3, horizontal surface power OHPm is larger than vertical surface power OVPm in the intermediate portion 13 of the area along the principal sight line 14 on the object-side surface 19A.

Further, difference between vertical surface power IVPf in the distance portion 11 and vertical surface power IVPn in the near portion 12 of the area along the principal sight lien 14 on the eyeball-side surface 19B, is larger than difference between vertical surface power OVPf in the distance portion 11 and vertical surface power OVPn in the near portion 12 of the area along the principal sight line 14 on the object-side surface 19A, so that addition can be realized on the eyeball-side surface 19B with respect to the degression on the object-side surface 19A (condition (4)).

Meanwhile, the progressive addition lens of comparative example 2 is a conventional inner surface progressive lens not including the abovementioned conditions (1) to (4).

Note that the variation of the surface power shown in FIG. 21 to FIG. 22 is briefly shown simply for understanding a basic structure. In an actual design, aspheric correction is added thereto, aiming at correcting an aberration in a lens circumferential view. A power variation is slightly generated in the vertical direction and the horizontal direction in the upper part of the distance portion 11 and the near portion 12.

4.4 Comparison Between Example 2-1 to Example 2-3 and Comparative Example 2

Figure 23A:
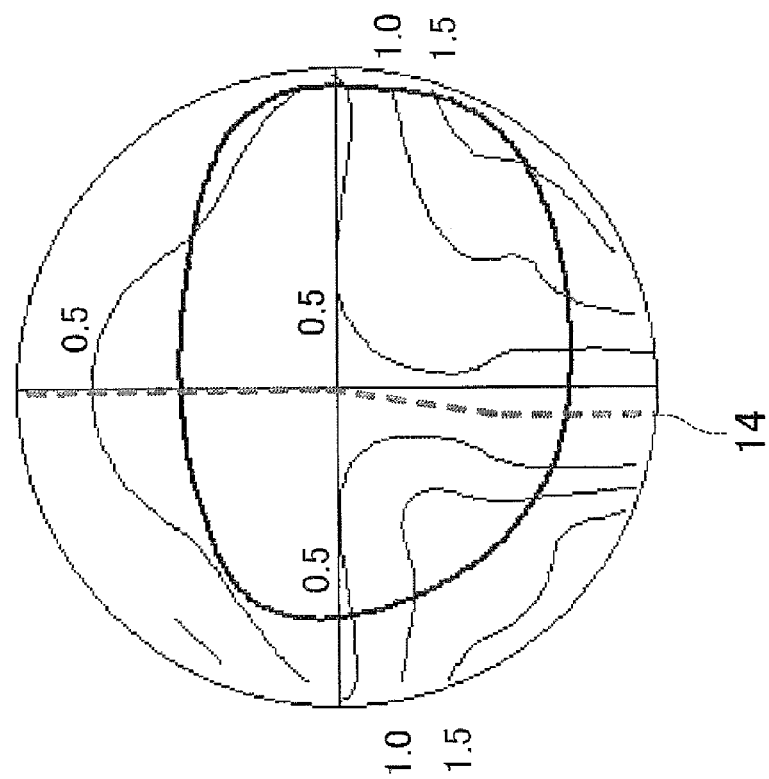
FIG. 23(A) is a view showing an astigmatism distribution when observing it through each position on a lens of the progressive addition lens of example 2-2.
Figure 23B:
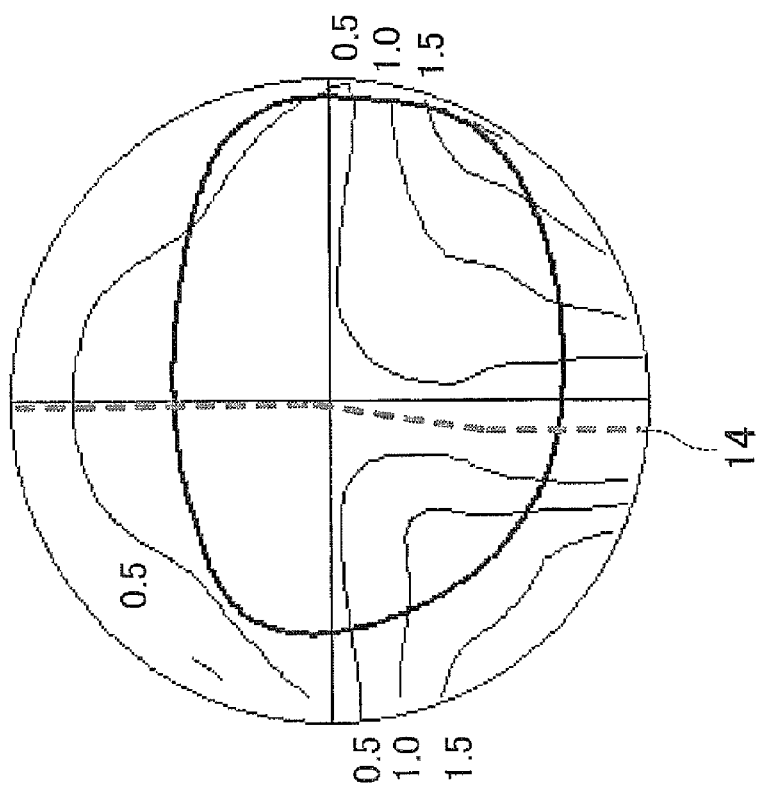
FIG. 23(B) is a view showing an astigmatism distribution when observing it through each position on a lens of the progressive addition lens of comparative example 2.

FIG. 23(A) is a view showing an astigmatism distribution when observing it through each position on the lens of the progressive addition lens of example 2-2, and FIG. 23(B) is a view showing an astigmatism distribution when observing it through each position on a lens of the progressive addition lens of comparative example 2. As shown in FIG. 23(A) to FIG. 23(B), the astigmatism distribution of the progressive addition lens of example 2-2 is approximately the same as the astigmatism distribution of the progressive addition lens of comparative example 2. Further, as estimated from the results shown in FIG. 18(A) to FIG. 18(D) and FIG. 23(A) to FIG. 23(B), the astigmatism distributions of the progressive addition lenses of example 2-1 and example 2-3 are also approximately the same as the astigmatism distribution of the progressive addition lens of comparative example 2.

Figure 24A:
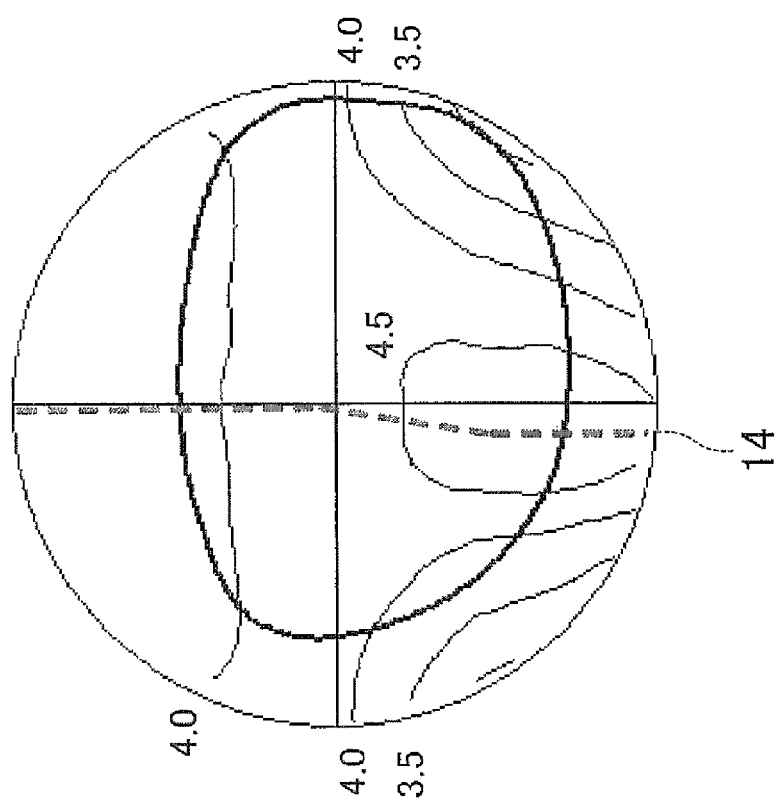
FIG. 24(A) is a view showing an equivalent spherical power distribution when observing it through each position on a lens of the progressive addition lens of example 2-2.
Figure 24B:
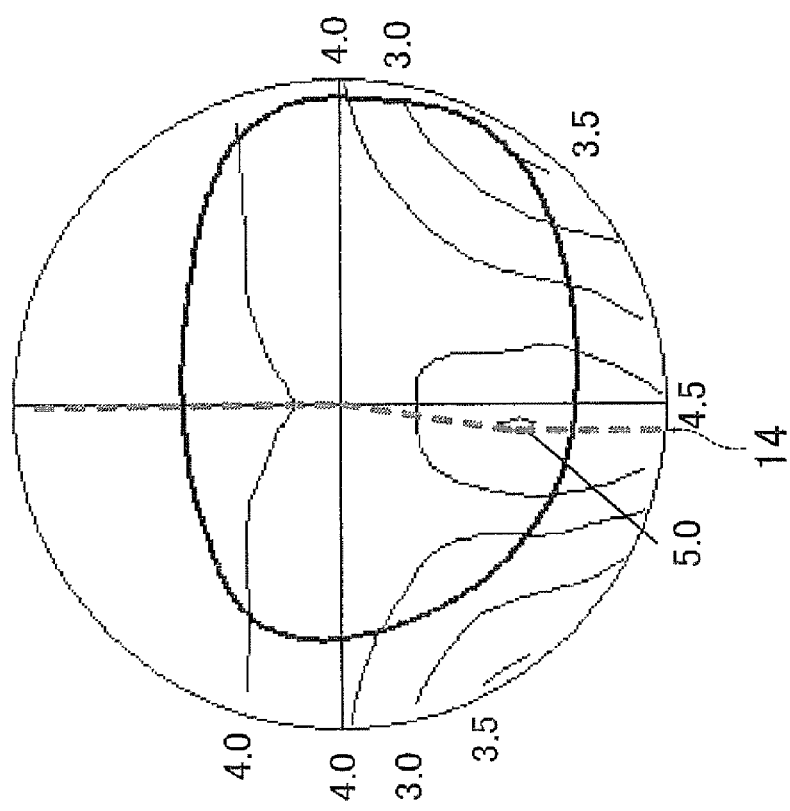
FIG. 24(B) is a view showing an equivalent spherical power distribution when observing it through each position on a lens of the progressive addition lens of comparative example 2.

FIG. 24(A) is a view showing an equivalent spherical power distribution when observing it through each position on a lens of the progressive addition lens of example 2-2, and FIG. 24(B) is a view showing an equivalent spherical power distribution when observing it through each position on a lens of the progressive addition lens of comparative example 2. As shown in FIG. 24(A) to FIG. 24(B), the equivalent spherical power distribution of the progressive addition lens of example 2-2 is approximately the same as the equivalent spherical power distribution of the progressive addition lens of comparative example 2. Also, as estimated from the results shown in FIG. 19(A) to FIG. 19(D) and FIG. 24(A) to FIG. 24(B), the equivalent spherical power distributions of the progressive addition lenses of example 2-1 and example 2-3 are also approximately the same as the equivalent spherical power distribution of the progressive addition lens of comparative example 2.

Accordingly, it is found that the progressive addition lens of example 2-1 to example 2-3 is the progressive addition lens having almost the same performance as the performance of the progressive addition lens of comparative example 2 in the astigmatism distribution and the equivalent spherical power distribution, by effectively using the aspheric correction.

FIG. 25 is a graph showing the swing index IDs of example 2-1 to example 2-3 and comparative example 2. The horizontal axis indicates a vertical viewing angle corresponding to the coordinate on the principal sight line, and the vertical axis indicates the value corresponding to "total L" in the swing indexes IDs. The pitch of the rectangular pattern 50 is 10 degrees, and the swing of the head is 10 degrees horizontally in right and left respectively.

As shown in FIG. 25, in any one of the example 2-1 to example 2-3, swing index IDs becomes smaller over the range from the distance portion 11 to the near portion 12, compared with comparative example 2. Accordingly, the progressive addition lenses of example 2-1 to example 2-3 are the lenses with less swing of image viewed through the lens, compared with the progressive addition lens of comparative example 2.

4.5 Structures of Example 3-1 to Example 3-3 and Comparative Example 3

Example 3-1 to example 3-3 and comparative example 3 are the examples and comparative example when power Sph is 4.00 (D) and addition power Add is 3.00 (D). Example 3-2 is shown in the figure hereafter, representing example 3-1 to example 3-3.

Figure 26A:
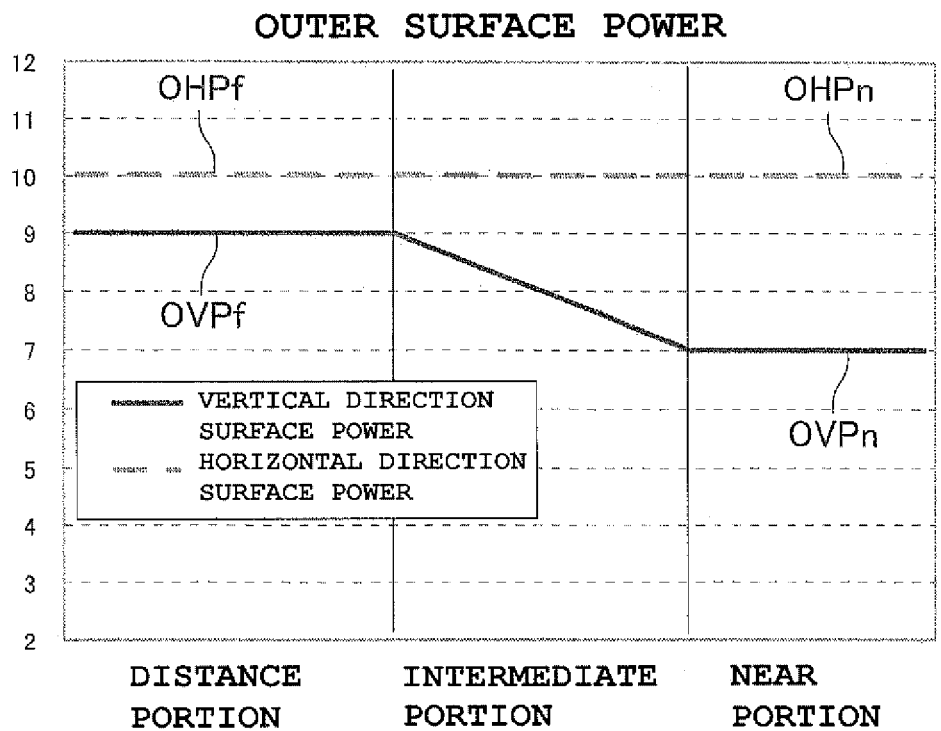
FIG. 26(A) is a graph showing vertical and horizontal surface powers on a principal sight line of example 3-2.
Figure 26B:
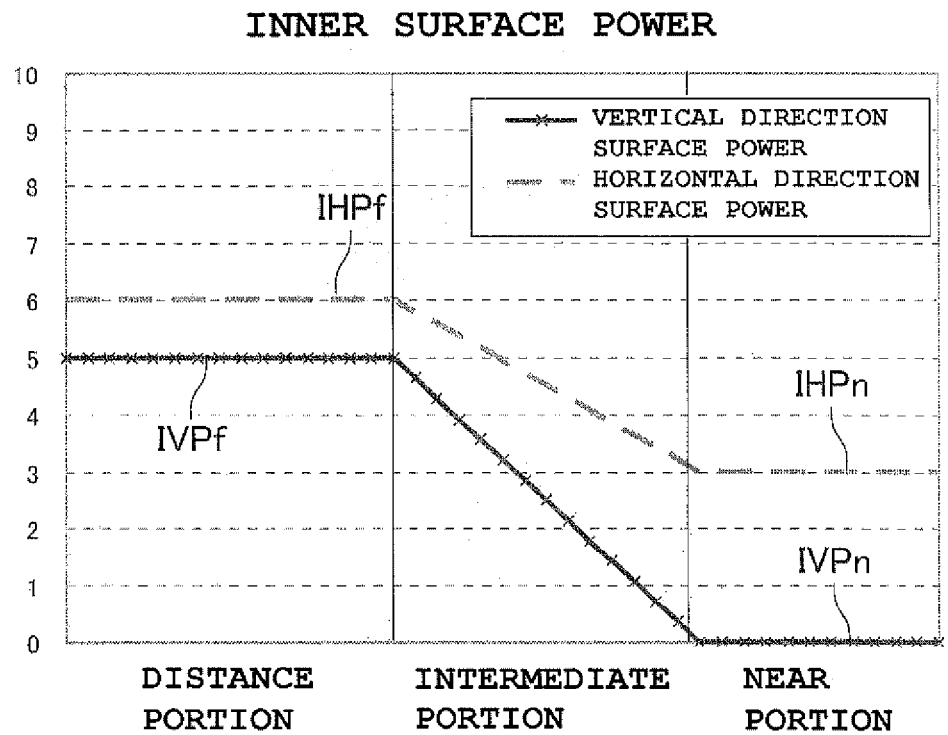
FIG. 26(B) is a graph showing vertical and horizontal inner surface powers on the principal sight line of example 3-2.
Figure 27A:
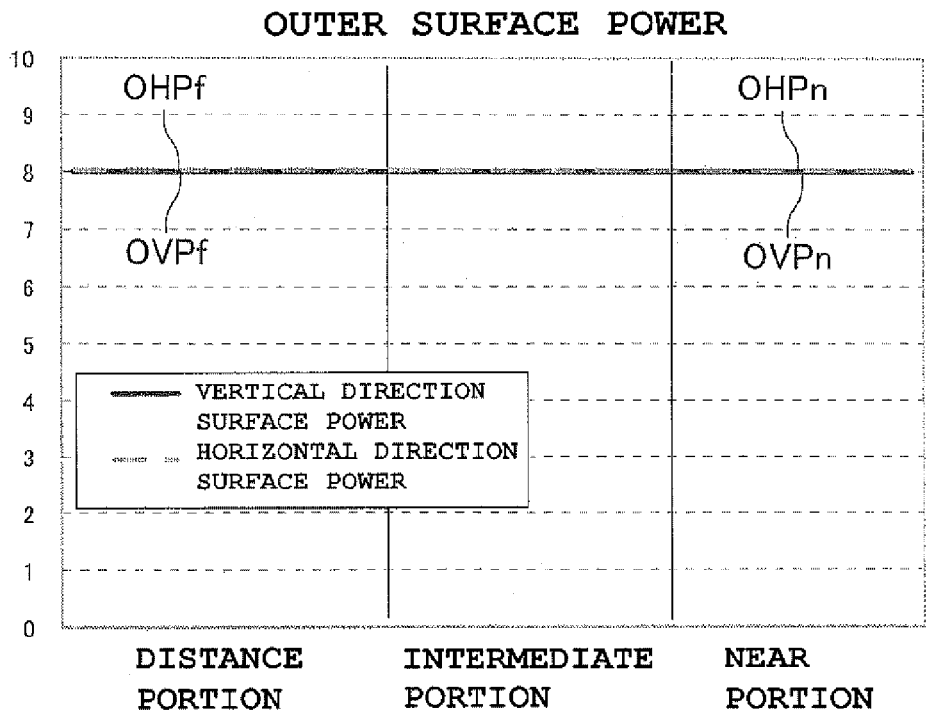
FIG. 27(A) is a graph showing vertical and horizontal surface powers on a principal sight line of comparative example 3.
Figure 27B:
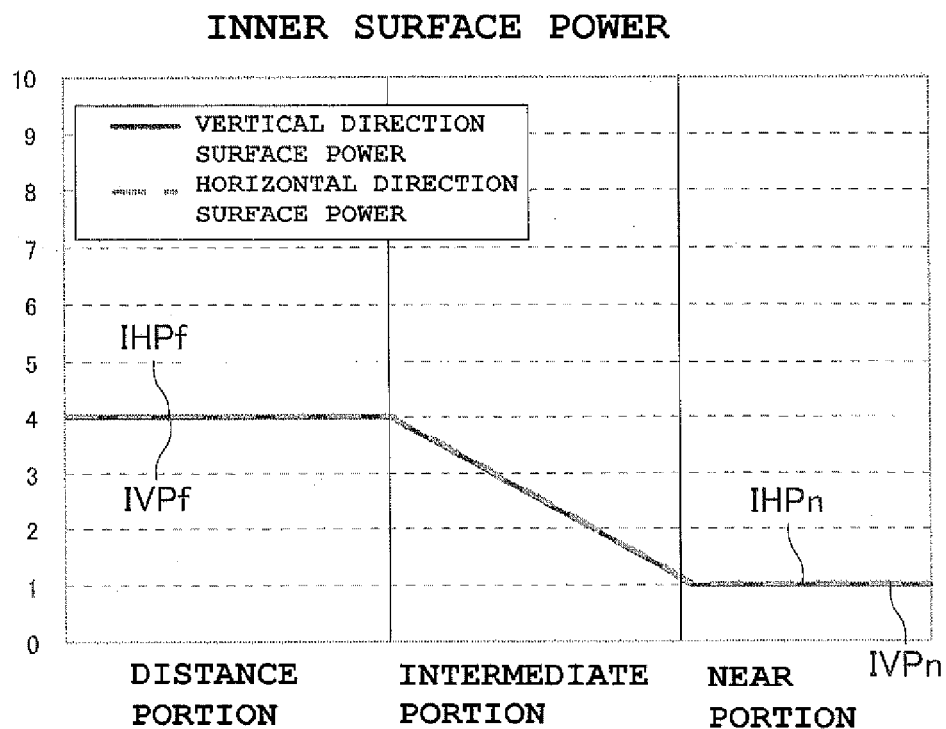
FIG. 27(B) is a graph showing vertical and horizontal inner surface powers on the principal sight line of comparative example 3.

FIG. 26(A) is a graph showing vertical and horizontal outer surface powers on the principal sight line of example 3-2, and FIG. 26(B) is a graph showing vertical and horizontal inner surface powers on the principal sight line of example 3-2. FIG. 27(A) is a graph showing vertical and horizontal outer surface powers on the principal sight line of comparative example 3, and FIG. 27(B) is a graph showing vertical and horizontal inner surface powers on the principal sight line of comparative example 3. In each case, the horizontal axis corresponds to the coordinate on the principal sight line.

The progressive addition lens of example 3-1 to example 3-3 includes the abovementioned conditions (1) to (4). Namely, horizontal surface power OHPf is larger than vertical surface power OVPf (condition (1)) in the distance portion 11 of the area along the principal sight line 14 on the object-side surface 19A. Also, horizontal surface power OHPn is larger than vertical surface power OVPn in the near portion 12 of the area along the principal sight line 14 on the object-side surface 19A (condition (2)). Also, vertical surface power OVPf in the distance portion 11 is larger than vertical surface power OVPn in the near portion 12, in a degressive state (condition (3)). Also, in the progressive addition lens of example 3-1 to example 3-3, horizontal surface power OHPm is larger than vertical surface power OVPm in the intermediate portion 13 of the area along the principal sight line 14 on the object-side surface 19A.

Further, difference between vertical surface power IVPf in the distance portion 11 and vertical surface power IVPn in the near portion 12 of the area along the principal sight lien 14 on the eyeball-side surface 19B, is larger than difference between vertical surface power OVPf in the distance portion 11 and vertical surface power OVPn in the near portion 12 of the area along the principal sight line 14 on the object-side surface 19A, so that addition can be realized on the eyeball-side surface 19B with respect to the degression on the object-side surface 19A (condition (4)).

Meanwhile, the progressive addition lens of comparative example 3 is a conventional inner surface progressive lens not including the abovementioned conditions (1) to (4).

Note that the variation of the surface power shown in FIG. 26 to FIG. 27 is briefly shown simply for understanding a basic structure. In an actual design, aspheric correction is added thereto, aiming correcting an aberration in a lens circumferential view. A power variation is slightly generated in the vertical direction and the horizontal direction in the upper part of the distance portion 11 and the near portion 12.

4.6 Comparison Between Example 3-1 to Example 3-3 and Comparative Example 3

Figure 28A:
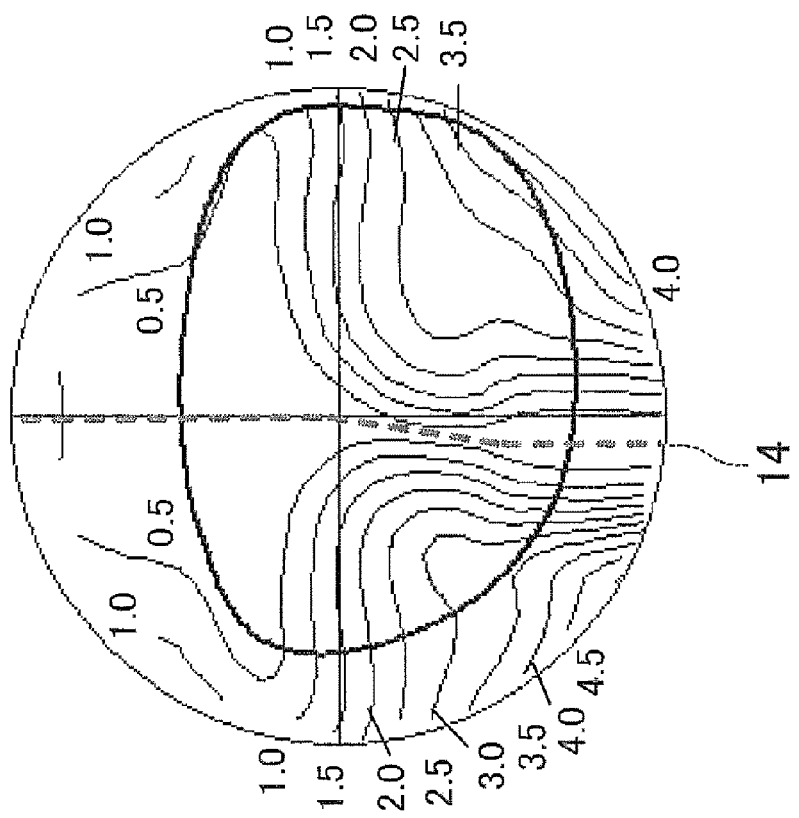
FIG. 28(A) is a view showing an astigmatism distribution when observing it through each position on a lens of the progressive addition lens of example 3-2.
Figure 28B:
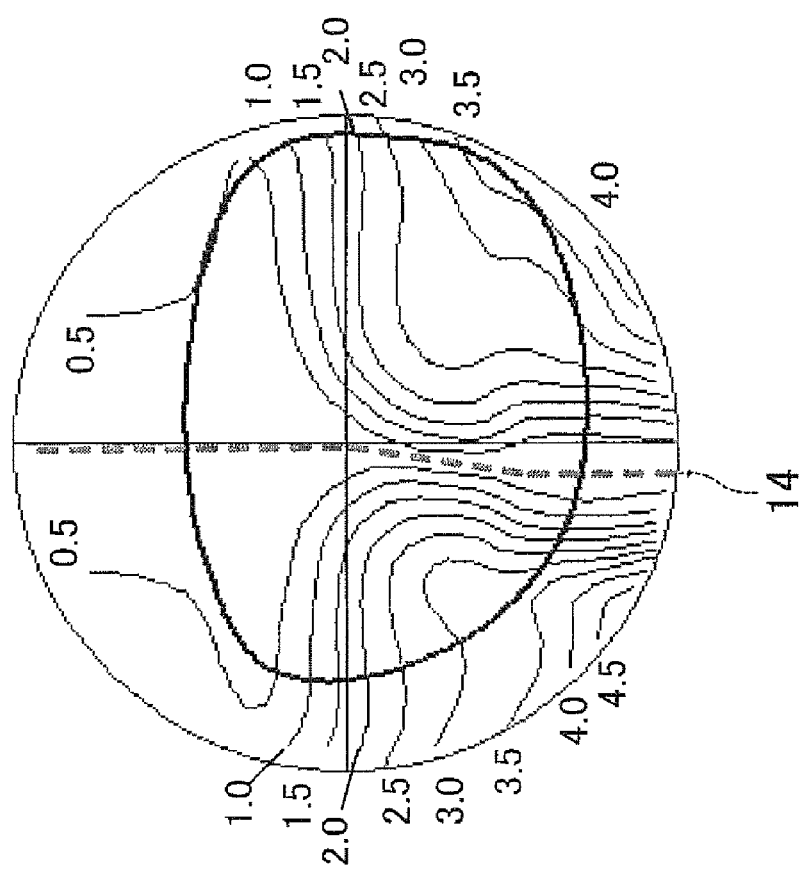
FIG. 28(B) is a view showing an astigmatism distribution when observing it through each position on a lens of the progressive addition lens of comparative example 3.

FIG. 28(A) is a view showing an astigmatism distribution when observing it through each position on the lens of the progressive addition lens of example 3-2, and FIG. 28(B) is a view showing an astigmatism distribution when observing it through each position on a lens of the progressive addition lens of comparative example 3. As shown in FIG. 28(A) to FIG. 28(B), the astigmatism distribution of the progressive addition lens of example 3-2 is approximately the same as the astigmatism distribution of the progressive addition lens of comparative example 3. Further, as estimated from the results shown in FIG. 18(A) to FIG. 18(D) and FIG. 28(A) to FIG. 28(B), the astigmatism distributions of the progressive addition lenses of example 3-1 and example 3-3 are also approximately the same as the astigmatism distribution of the progressive addition lens of comparative example 3.

Figure 29B:
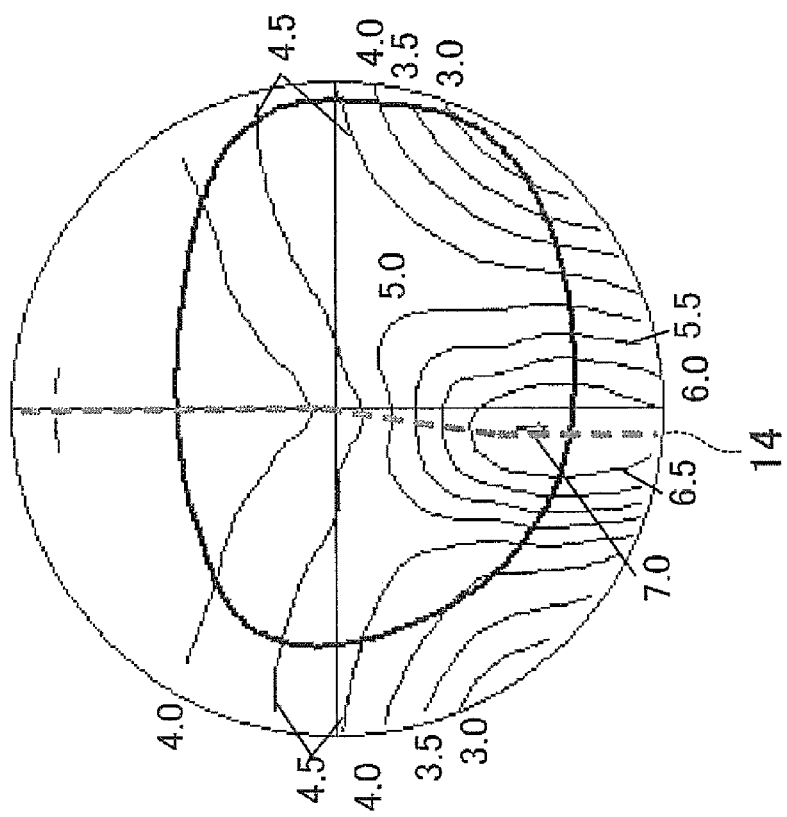
FIG. 29(B) is a view showing an equivalent surface power distribution when observing it through each position on a lens of the progressive addition lens of comparative example 3.
Figure 29A:
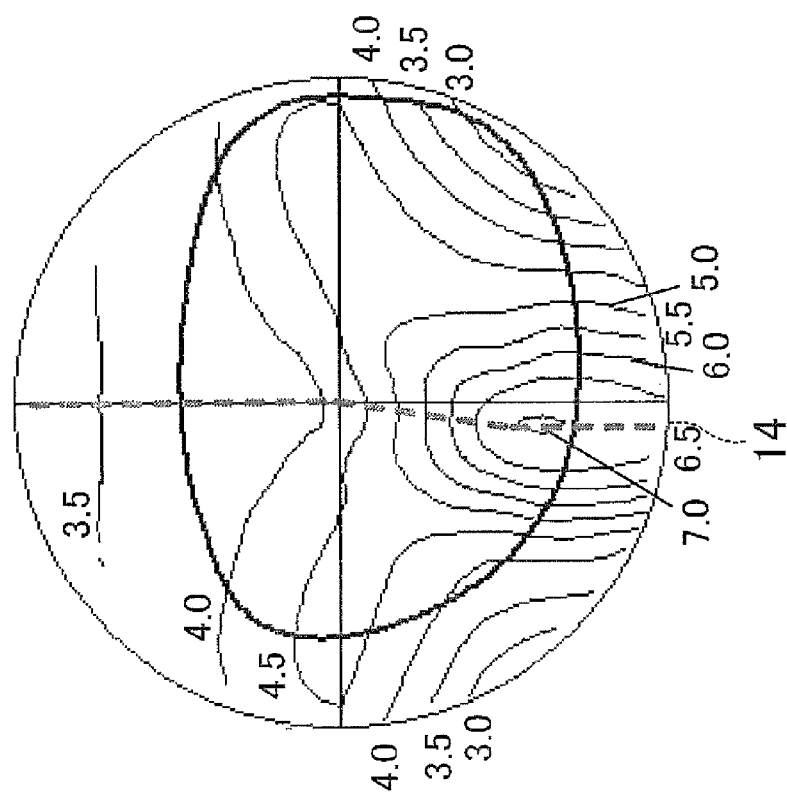
FIG. 29(A) is a view showing an equivalent spherical power when observing it through each position on a lens of the progressive addition lens of example 3-2.

FIG. 29(A) is a view showing an equivalent spherical power distribution when observing it through each position on a lens of the progressive addition lens of example 3-2, and FIG. 29(B) is a view showing an equivalent spherical power distribution when observing it through each position on a lens of the progressive addition lens of comparative example 3. As shown in FIG. 29(A) to FIG. 29(B), the equivalent spherical power distribution of the progressive addition lens of example 3-2 is approximately the same as the equivalent spherical power distribution of the progressive addition lens of comparative example 3. Also, as estimated from the results shown in FIG. 19(A) to FIG. 19(D) and FIG. 29(A) to FIG. 29(B), the equivalent spherical power distribution of the progressive addition lenses of example 3-1 and example 3-3 are also approximately the same as the equivalent spherical power distribution of the progressive addition lens of comparative example 3.

Accordingly, it is found that the progressive addition lenses of example 3-1 to example 3-3 are the progressive addition lenses having almost the same performance as the performance of the progressive addition lens of comparative example 3 in the astigmatism distribution and the equivalent spherical power distribution, by effectively using the aspheric correction.

FIG. 30 is a graph showing the swing index IDs of example 3-1 to example 3-3 and comparative example 3. The horizontal axis indicates a vertical viewing angle corresponding to the coordinate on the principal sight line, and the vertical axis indicates the value corresponding to "total L" in the swing indexes IDs. The pitch of the rectangular pattern 50 is 10 degrees, and the swing of the head is 10 degrees horizontally in right and left respectively.

As shown in FIG. 30, in any one of the example 3-1 to example 3-3, swing index IDs becomes smaller over the range from the distance portion 11 to the near portion 12, compared with comparative example 3. Accordingly, the progressive addition lenses of example 3-1 to example 3-3 are the lenses with less swing of image viewed through the lens, compared with the progressive addition lens of comparative example 3.

4.7. Conclusion

From the abovementioned result, it is found that each example presents a lens with less swing of image viewed through a lens, compared with corresponding comparative examples, irrespective of magnitude of the addition power Add, and irrespective of the degressive element.

Note that the abovementioned embodiment and each modified example are given as an example, and the present invention is not limited thereto. For example, the abovementioned embodiments and modified examples may be suitably combined.

The present invention is not limited to the abovementioned embodiments and examples, but can be variously modified. For example, the present invention includes substantially the same structure as the structure described in the embodiment (for example, the structure in which functions and methods are same, or the structure in which objects and effects are same). Also, the present invention includes a structure in which no-essential portion of the structure described in the embodiment is replaced. Also, the present invention includes a structure capable of exhibiting the same effect as the effect of the structure described in the embodiment, or a structure capable of achieving the same object. Also, the present invention includes a structure in which a publicly-known technique is added to the structure described in the embodiment.

For example, the abovementioned embodiments and examples show an example without astigmatic prescription. However, the present invention can be applied to a lens with astigmatic prescription. For example, the toric surface (toroidal surface) may be further combined on the eyeball-side surface for correcting astigmatism. Thus, a lens including astigmatic correction can be realized while keeping the effect of the present invention.

DESCRIPTION OF SIGNS AND NUMERALS

1 Spectacle
2 Sight line
3 Eyeball
7 Rotation of eye
8 Rotation of head
9 Object
10a First lens
10b Second lens
10, 10L, 10R Lens
11 Distance portion
12 Near portion
13 Intermediate portion
14 Principal sight line
19A Object-side surface (outer surface)
19B Eyeball-side surface (inner surface)
20 Frame
41, 42 Graph
50, 50a, 50b Rectangular pattern
51, 52 Vertical grid line
53, 54 Horizontal grid line
55 Geometrical center
59 Virtual surface
100 Lens set
d Distance
Pe Fitting point
Rc Rotation center

The invention claimed is:

1. A lens set, comprising:
a first lens; and
a second lens,
wherein the first lens and the second lens are respectively a progressive addition lenses for spectacles which has a distance portion and a near portion having different powers and in which an equivalent spherical power of the distance portion is plus; and
the first lens and the second lens have different addition powers from each other, and
wherein in the first lens, when a horizontal surface power of the distance portion along a vertical reference line or a principal sight line passing through a fitting point is defined as OHPf1, and vertical surface power of the distance portion along the vertical reference line or the principal sight line is defined as OVPf1, and horizontal surface power of the near portion along the vertical reference line or the principal sight line is defined as OHPn1, and vertical surface power of the near portion along the vertical reference line or the principal sight line is defined as OVPn1, in an object-side surface,
the OVPn1 is smaller than the OVPf1, and
the object-side surface includes a toric surface element in which the OHPf1 is larger than the OVPf1, and the OHPn1 is larger than the OVPn1, and
an eyeball-side surface along the vertical reference line or the principal sight line includes an element for cancelling the toric surface element,
and also in the second lens, when a horizontal surface power of the distance portion on an object-side surface along a vertical reference line or a principal sight line passing through a fitting point is defined as OHPf2, and vertical surface power of the distance portion along the vertical reference line or the principal sight line is defined as OVPf2, horizontal surface power of the near portion along the vertical reference line or the principal sight line is defined as OHPn2, and vertical surface power of the near portion along the vertical reference line or the principal sight line is defined as OVPn2, in an object-side surface,
the OVPn2 is smaller than the OVPf2, and
the object-side surface includes a toric surface element in which the OHPf2 is larger than the OVPf2, and the OHPn2 is larger than the OVPn2, and
an eyeball-side surface along the vertical reference line or the principal sight line includes an element for cancelling the toric surface element, and
a difference between the OVPf1 and the OVPn1, and a difference between the OVPf2 and the OVPn2 are the same.

2. A method of designing a lens set comprising a first lens and a second lens, wherein the first lens and the second lenses are respectively a progressive addition lens for spectacles which has a distance portion and a near portion having different powers and in which an equivalent spherical power of the distance portion is plus, and the first lens and the second lens have different addition powers from each other,
wherein in the first lens, when a horizontal surface power of the distance portion along a vertical reference line or a principal sight line passing through a fitting point is defined as OHPf1, and vertical surface power of the distance portion along the vertical reference line or the principal sight line is defined as OVPf1, and horizontal surface power of the near portion along the vertical reference line or the principal sight line is defined as OHPn1, and vertical surface power of the near portion along the vertical reference line or the principal sight line is defined as OVPn1, in an object-side surface,
the object-side surface includes a toric surface element in which the OVPn1 is smaller than the OVPf1, and
the object-side surface includes a toric surface element in which the OHPf1 is larger than the OVPf1, and the OHPn1 is larger than the OVPn1, and an eyeball-side surface along the vertical reference line or the principal sight line includes an element for cancelling the toric surface element,
and also in the second lens, when a horizontal surface power of the distance portion along a vertical reference line or a principal sight line passing through a fitting point is defined as OHPf2, and vertical surface power of the distance portion along the vertical reference line or the principal sight line is defined as OVPf2, and horizontal surface power of the near portion along the vertical reference line or the principal sight line is defined as OHPn2, and vertical surface power of the near portion along the vertical reference line or the principal sight line is defined as OVPn2, in an object-side surface, the OVPn2 is smaller than the OVPf2, and the object-side surface includes a toric surface element in which the OHPf2 is larger than the OVPf2, and the OHPn2 is larger than the OVPn2, and an eyeball-side surface along the vertical reference line or the principal sight line includes an element for cancelling the toric surface element, and a difference between the OVPf1 and the OVPn1, and a difference between the OVPf2 and the OVPn2 are the same.

3. A method of manufacturing a lens set, comprising manufacturing the lens set designed by the method of designing a lens set of claim 2.

* * * * *